(12) United States Patent
Butler et al.

(10) Patent No.: US 9,596,091 B2
(45) Date of Patent: Mar. 14, 2017

(54) MULTIPLE SENSOR DATA PROCESSOR INTERFACE AND RELAY

(71) Applicant: Camgian Microsystems Corp., Starkville, MS (US)

(72) Inventors: Gary Butler, Starkville, MS (US); Derrick J. Savage, Starkville, MS (US); David Lindley, Starkville, MS (US); Muthukumar Nagarajan, Starkville, MS (US); Jeffery Hunt, Starkville, MS (US)

(73) Assignee: Camgian Microsystems, Corp, Starkville, MS (US)

( * ) Notice: Subject to any disclaimer, the term of this patent is extended or adjusted under 35 U.S.C. 154(b) by 161 days.

(21) Appl. No.: 14/658,131

(22) Filed: Mar. 13, 2015

(65) Prior Publication Data
US 2015/0341179 A1   Nov. 26, 2015

Related U.S. Application Data

(60) Provisional application No. 61/954,025, filed on Mar. 17, 2014.

(51) Int. Cl.
*H04L 12/10* (2006.01)
*G08C 15/00* (2006.01)
*H04L 29/08* (2006.01)
*H04Q 9/00* (2006.01)

(52) U.S. Cl.
CPC .............. *H04L 12/10* (2013.01); *G08C 15/00* (2013.01); *H04L 67/12* (2013.01); *H04L 67/2823* (2013.01); *H04Q 9/00* (2013.01); *H04Q 2209/30* (2013.01); *H04Q 2209/43* (2013.01); *H04Q 2209/883* (2013.01)

(58) Field of Classification Search
CPC ..... H04L 12/10; H04L 67/2823; H04L 67/12; H04Q 9/00; H04Q 2209/883; H04Q 2209/30; H04Q 2209/43; G08C 15/00
See application file for complete search history.

(56) References Cited

U.S. PATENT DOCUMENTS

2002/0174282 A1* 11/2002 Murakami ............ G06F 13/364
710/306

\* cited by examiner

*Primary Examiner* — Christopher Grey
(74) *Attorney, Agent, or Firm* — Lance C. Venable

(57) ABSTRACT

The present invention relates generally to a system and method of networking and interconnecting a large number of various types of sensors to a remote location in an efficient manner. Specifically, the invention utilizes a flexible, configurable, scalable and power-efficient sensor interface relay architecture to gather sensor data from various locations and then relay it to a remote location via the internet.

15 Claims, 22 Drawing Sheets

FIG. 9

| MODE | VCC | Port | EN1_Pmux_3V | EN1_PSW_5V | EN12_Pmux_5V | EN2_PSW_5V | EN2_Pmux_3V | RMS_en1 | RMS_en1_n | Anal_en1 | I2C_en1 | DXEN1 | RXEN1_n | DZ1 | TE485_1 | RS485_1 | LB | H_Duplex | FEN | RS485_2 | TE485_2 | DZ2 | RXEN2_n | DXEN2 | I2C_en2 | Anal_en2 | RMS_en2_n | RMS_en2 |
|---|---|---|---|---|---|---|---|---|---|---|---|---|---|---|---|---|---|---|---|---|---|---|---|---|---|---|---|---|
| Power Down | NA | NA | 0 | 0 | 0 | 0 | 0 | 0 | N | 0 | 0 | 0 | N | 0 | 0 | 0 | 0 | 0 | 0 | 0 | 0 | 0 | N | 0 | 0 | 0 | N | 0 |
| Analog VAC | 3V | 1 | 1 | 1 | 0 | 0 | 0 | 1 | 0 | 0 | 0 | 0 | N | 0 | 0 | 0 | 0 | 0 | 0 | 0 | 0 | 0 | N | 0 | 0 | 0 | N | 0 |
| Analog VAC | 5V | 1 | 0 | 1 | 0 | 0 | 0 | 1 | 0 | 0 | 0 | 0 | N | 0 | 0 | 0 | 0 | 0 | 0 | 0 | 0 | 0 | N | 0 | 0 | 0 | N | 0 |
| Analog VDC/Res | 3V | 1 | 1 | 1 | 0 | 0 | 0 | 0 | N | 1 | 0 | 0 | N | 0 | 0 | 0 | 0 | 0 | 0 | 0 | 0 | 0 | N | 0 | 0 | 0 | N | 0 |
| Analog VDC/Res | 5V | 1 | 0 | 1 | 0 | 0 | 0 | 0 | N | 1 | 0 | 0 | N | 0 | 0 | 0 | 0 | 0 | 0 | 0 | 0 | 0 | N | 0 | 0 | 0 | N | 0 |
| I2C | 3V | 1 | 1 | 1 | 0 | 0 | 0 | 0 | N | 0 | 1 | 0 | N | 0 | 0 | 0 | 0 | 0 | 0 | 0 | 0 | 0 | N | 0 | 0 | 0 | N | 0 |
| I2C | 5V | 1 | 0 | 1 | 0 | 0 | 0 | 0 | N | 0 | 1 | 0 | N | 0 | 0 | 0 | 0 | 0 | 1 | 0 | 0 | 0 | N | 0 | 0 | 0 | N | 0 |
| RS232 | 3V | 1 | 1 | 1 | 0 | 0 | 0 | 0 | N | 0 | 0 | 1 | 0 | 1 | 0 | 0 | 0 | 0 | 1 | 0 | 0 | 0 | N | 0 | 0 | 0 | N | 0 |
| RS232 | 5V | 1 | 0 | 1 | 0 | 0 | 0 | 0 | N | 0 | 0 | 10 | 1 | 1 | 0 | 0 | 0 | 0 | 1 | 0 | 0 | 0 | N | 0 | 0 | 0 | N | 0 |
| RS485 | 3V | 1 | 1 | 1 | 0 | 0 | 0 | 0 | N | 0 | 0 | 10 | 1 | 0 | 1 | 1 | 0 | 0 | 0 | 0 | 0 | 0 | N | 0 | 0 | 0 | N | 0 |
| RS485 | 5V | 1 | 0 | 1 | 0 | 0 | 0 | 0 | N | 0 | 0 | 0 | N | 0 | 1 | 1 | 0 | 0 | 0 | 0 | 0 | 0 | N | 0 | 0 | 0 | N | 0 |
| Open Drn/Col & 1 Wire | 3V | 1 | 1 | 1 | 0 | 0 | 0 | 0 | N | 0 | 0 | 0 | N | 0 | 0 | 0 | 0 | 1 | 0 | 0 | 0 | 0 | N | 0 | 0 | 0 | N | 0 |
| Open Drn/Col & 1 Wire | 5V | 1 | 0 | 1 | 0 | 0 | 0 | 0 | N | 0 | 0 | 0 | N | 0 | 0 | 0 | 0 | 1 | 0 | 0 | 0 | 0 | N | 0 | 0 | 0 | N | 0 |
| CMOS UART | 3V | 1 | 1 | 0 | 1 | 1 | 1 | 0 | N | 0 | 0 | 0 | N | 0 | 0 | 0 | 0 | 0 | 0 | 0 | 0 | 0 | 0 | 1 | 0 | 0 | 0 | 1 |
| CMOS UART | 5V | 1 | 0 | 0 | 1 | 1 | 1 | 0 | N | 0 | 0 | 0 | N | 0 | 0 | 0 | 0 | 0 | 0 | 0 | 0 | 0 | 0 | 1 | 0 | 0 | 0 | 1 |
| Analog VAC | 3V | 2 | 1 | 0 | 1 | 1 | 0 | 0 | N | 0 | 0 | 0 | N | 0 | 0 | 0 | 0 | 0 | 0 | 0 | 0 | 0 | N | 0 | 0 | 1 | 0 | 0 |
| Analog VAC | 5V | 2 | 0 | 0 | 1 | 1 | 0 | 0 | N | 0 | 0 | 0 | N | 0 | 0 | 0 | 0 | 0 | 0 | 0 | 0 | 0 | N | 0 | 0 | 1 | 0 | 0 |
| Analog VDC/Res | 3V | 2 | 1 | 0 | 1 | 1 | 1 | 0 | N | 0 | 0 | 0 | N | 0 | 0 | 0 | 0 | 0 | 1 | 0 | 0 | 0 | N | 0 | 0 | 0 | N | 0 |
| Analog VDC/Res | 5V | 2 | 0 | 0 | 1 | 1 | 1 | 0 | N | 0 | 0 | 0 | N | 0 | 0 | 0 | 0 | 0 | 1 | 0 | 0 | 0 | N | 0 | 0 | 0 | N | 0 |
| I2C | 3V | 2 | 1 | 0 | 1 | 1 | 0 | 0 | N | 0 | 0 | 0 | N | 0 | 0 | 0 | 0 | 0 | 1 | 0 | 0 | 0 | N | 0 | 1 | 0 | N | 0 |
| I2C | 5V | 2 | 0 | 0 | 1 | 1 | 0 | 0 | N | 0 | 0 | 0 | N | 0 | 0 | 0 | 0 | 0 | 1 | 0 | 0 | 0 | N | 0 | 1 | 0 | N | 0 |
| RS232 | 3V | 2 | 1 | 0 | 1 | 1 | 1 | 0 | N | 0 | 0 | 0 | N | 0 | 0 | 0 | 0 | 0 | 1 | 0 | 0 | 0 | 0 | 1 | 0 | 0 | N | 0 |
| RS232 | 5V | 2 | 0 | 0 | 0 | 1 | 0 | 0 | N | 0 | 0 | 0 | N | 0 | 0 | 0 | 0 | 0 | 1 | 0 | 0 | 10 | 1 | 1 | 0 | 0 | N | 0 |
| RS485 | 3V | 2 | 1 | 0 | 1 | 0 | 1 | 0 | N | 0 | 0 | 0 | N | 0 | 0 | 0 | 0 | 0 | 1 | 1 | 1 | 10 | 1 | 0 | 0 | 0 | N | 0 |
| RS485 | 5V | 2 | 0 | 0 | 1 | 0 | 1 | 0 | N | 0 | 0 | 0 | N | 0 | 0 | 0 | 0 | 0 | 1 | 1 | 1 | 0 | N | 0 | 0 | 0 | N | 0 |
| Open Drn/Col & 1 Wire | 3V | 2 | 1 | 0 | 0 | 0 | 0 | 0 | N | 0 | 0 | 0 | N | 0 | 0 | 0 | 0 | 1 | 0 | 0 | 0 | 0 | N | 0 | 0 | 0 | N | 0 |
| Open Drn/Col & 1 Wire | 5V | 2 | 1 | 0 | 0 | 0 | 0 | 0 | N | 0 | 0 | 0 | N | 0 | 0 | 0 | 0 | 1 | 0 | 0 | 0 | 0 | N | 0 | 0 | 0 | N | 0 |
| CMOS UART | 3V | 2 | 1 | 0 | 0 | 0 | 0 | 0 | N | 0 | 0 | 0 | N | 0 | 0 | 0 | 0 | 0 | 0 | 0 | 0 | 0 | N | 0 | 0 | 0 | N | 0 |
| CMOS UART | 5V | 2 | 0 | 0 | 0 | 0 | 0 | 0 | N | 0 | 0 | 0 | N | 0 | 0 | 0 | 0 | 0 | 0 | 0 | 0 | 0 | N | 0 | 0 | 0 | N | 0 |

| EN1_3V | EN1_5V | VCC1_3V5V | VCC1_5V |
|---|---|---|---|
| 0 | 0 | 0.0V | 0.0V |
| 0 | 1 | 5.0V | 5.0V |
| 1 | 0 | 3.3V | 0.0V |
| 1 | 1 | 3.3V | 5.0V |

27

| EN2_3V | EN2_5V | VCC2_3V5V | VCC2_5V |
|---|---|---|---|
| 0 | 0 | 0.0V | 0.0V |
| 0 | 1 | 5.0V | 5.0V |
| 1 | 0 | 3.3V | 0.0V |
| 1 | 1 | 3.3V | 5.0V |

| EN12_5V | EN1_5V | EN2_5V | VCC12_5V |
|---|---|---|---|
| X | 0 | 0 | 0.0V |
| 0 | 0 | X | 0.0V |
| 1 | X | 0 | 0.0V |
| 0 | 1 | X | 5.0V |
| 1 | X | 1 | 5.0V |
| X | 1 | 1 | 5.0V |

FIG. 12

MULTIPLE SENSOR DATA PROCESSOR INTERFACE AND RELAY

FIELD OF THE INVENTION

The present invention relates generally to a system and method of networking and interconnecting a large number of various types of sensors to a remote location in an efficient manner. Specifically, the invention utilizes a flexible, configurable, scalable and power-efficient sensor interface relay architecture to gather, process, and analyze sensor data from various locations and then relay it to a remote location via the internet.

BACKGROUND OF THE INVENTION

A wide variety of sensor types are required to monitor assets like an office building, a store or a large campus. In addition, a number of these sensors are required for monitoring large assets. It is therefore preferred to have very low cost sensors. The sensor data must typically be processed, analyzed, and communicated to a remote location for further analysis. Communicating sensor data over long distances by wires is very cumbersome, prone to damage and comes with a high cost of installation and time. On the other hand, having wireless communication capabilities in each sensor is highly cost prohibitive and power inefficient. Moreover, there are a large number of sensor electrical interfaces that are different from each other.

To solve the problem of connecting a large number of different sensor types of sensors to a remote location in an efficient manner, a highly flexible, configurable, scalable and power efficient sensor interface architecture has been devised. Multiple sensors with a wide variety of electrical interfaces in a localized area can be connected by wire to a unit called the Sensor Interface Relay (SIR) that hosts the flexible sensor interface architecture.

The SIR can gather data from multiple sensors, process and analyze the data, and then relay the data to a remote location via wired or wireless communications as needed. In order to do this, the SIR architecture allows multiple sensors with different electrical interfaces to be connected to it via sensor ports. The data analysis is performed by the first processing unit (the main micro-controller PSoC5). The micro-controller has an embedded ARM Cortex M3 CPU that is used to analyze the sensor data and also perform other functions. Commercially available or custom software can be used to calculate statistical or application-specific analytics on the first processing unit. The architecture is highly flexible by allowing any of the supported sensor interfaces to be connected to any sensor port in any combination. It is highly configurable by allowing any of the sensor ports to be programmed to interface with any supported sensor. The architecture can be easily scaled to support a large number of sensors using one SIR. By being power efficient, the SIR can operate on battery power without the need for battery replacement for a long time.

SUMMARY OF THE INVENTION

The Sensor Interface Relay (SIR) is directed to a system and method of networking and interconnecting a large number of various types of sensors to a remote location in an efficient manner. Specifically, the SIR utilizes a flexible, configurable, scalable and power-efficient sensor interface relay architecture to gather, process and analyze sensor data from various locations and then relay it to a remote location via the internet.

A first aspect of the invention is a method of obtaining inputs from a plurality of sensor coupling ports. The method includes a first processing unit communicating a state change on a first common addressing signal coupled to each of a plurality of second processing units and uniquely addressing one of the plurality of second processing units on at least one additional addressing signal. The first processing unit also communicates a state change on a common enable signal coupled to each of the plurality of second processing units. One of the plurality of second processing units detects the state change on the first common addressing signal, the unique addressing, and the subsequent state change on the common enable signal line and enables communication from the first processing unit to the one uniquely addressed second processing unit to enable a sensor coupling port coupled to the uniquely addressed second processing unit to receive input. Input is subsequently received to the first processing unit from the sensor coupling port.

Additional aspects of the method include uniquely addressing one of the plurality of second processing units by addressing the second processing units over a plurality of addressing signals respectively coupled to each of the second processing units. The uniquely addressed second processing unit may communicate to sensor interface circuitry to communicate over the sensor coupling port in a standard selected from RS232, RS485, UART, Open Collector, Open Drain, I2C, Maxim 1-Wire, Analog AC voltage, Analog DC voltage, Analog Resistance, CMOS, and TTL. It is a further aspect to eliminate power from the non-uniquely addressed remaining plurality of second processing units. A further aspect includes uniquely addressing a second of the plurality of second processing units, subsequently initiating a state change on the common enable signal line coupled to each of the plurality of second processing units, and detecting both the unique addressing and the subsequently initiated state change on the common enable signal line in the second of the plurality of second processing units, and communicating from the first processing unit to the second uniquely addressed second processing unit to receive input from the second sensor coupling port. And the second uniquely addressed second processing unit may communicate to a second sensor interface circuit to communicates over the second sensor coupling port in a standard selected from RS232, RS485, UART, Open Collector, Open Drain, I2C, Maxim 1-Wire, Analog AC voltage, Analog DC voltage, Analog Resistance, CMOS, and TTL. Another aspect includes sourcing a sensor power supply signal to one of the plurality of sensor coupling ports prior to communicating the state change on the first common addressing signal. Another aspect includes that the plurality of sensor coupling ports are unpowered and receipt of sensor input is initiated on receipt of an interrupt received from the sensor coupling port. Alternatively, the sensing operations may be initiated at programmed intervals. Another aspect includes enabling sensor interface circuitry such as an RS232 or RS485 transceiver or a root mean square to DC voltage converter to communicate with the sensor coupling port. An additional aspect includes eliminating power to the plurality of second processing units and transmitting received input to at least one remote hardware and software system.

Aspects of the invention are implementable in a sensing interface circuit comprised of a first processing unit having outputs including a first common enable signal, a plurality of addressing signals, and plurality of individual enable signals. A plurality of second processing units are each coupled to processor memory containing configuration programming information to configure the sensing interface circuit to provide power and communications over each of a plurality of sensor coupling ports, each of the plurality of sensor coupling ports coupled to one of the plurality of first processing units, each sensor coupling port including at least one sensor voltage supply connection, and at least one sensor receive input. The plurality of second processing units are each coupled to the first common enable signal and the plurality of addressing signals and each respectively connected to one of the plurality of individual enable signals to initiate receipt of input from the sensor coupling ports.

Another aspect of the sensing interface circuit includes a plurality of communications sensor interface circuits selected from RS232 transceivers, RS485 transceivers, and root mean square to DC voltage converter circuits that are respectively coupled between the plurality of second processing units and the plurality of sensor connection ports. Another aspect of the sensing interface circuit may include a sensor transmit output. A transmitter selected from GPS radio, Cellular radio, ZigBee radio, and a POTS transceiver, may be coupled to the first processing unit to relay received input to a remote hardware and software system.

The novel features of invention itself, both as to its structure and its operation together with the additional object and advantages will best be understood from the following description of the preferred embodiment of the system. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6 are sought to be invoked to define the invention(s), the claims will specifically state the phrases "means for" or "step for" and a function, without also reciting in such phrases any structure, material, or act in support of the function.

Moreover, even if the provisions of 35 U.S.C. §112, paragraph 6 are invoked to define the inventions, it is intended that the inventions not be limited only to the specific structure, material or acts that are described in the preferred embodiments, but in addition, include any structures, materials or acts that perform the claimed function, along with any and all known or later developed equivalent structures, materials, or acts for performing the claimed function.

BRIEF DESCRIPTION OF THE DRAWINGS

FIG. 12 is a truth table showing the possible combinations of inputs and outputs for the SIP block.

DESCRIPTION OF PREFERRED EMBODIMENT

Figure 1:
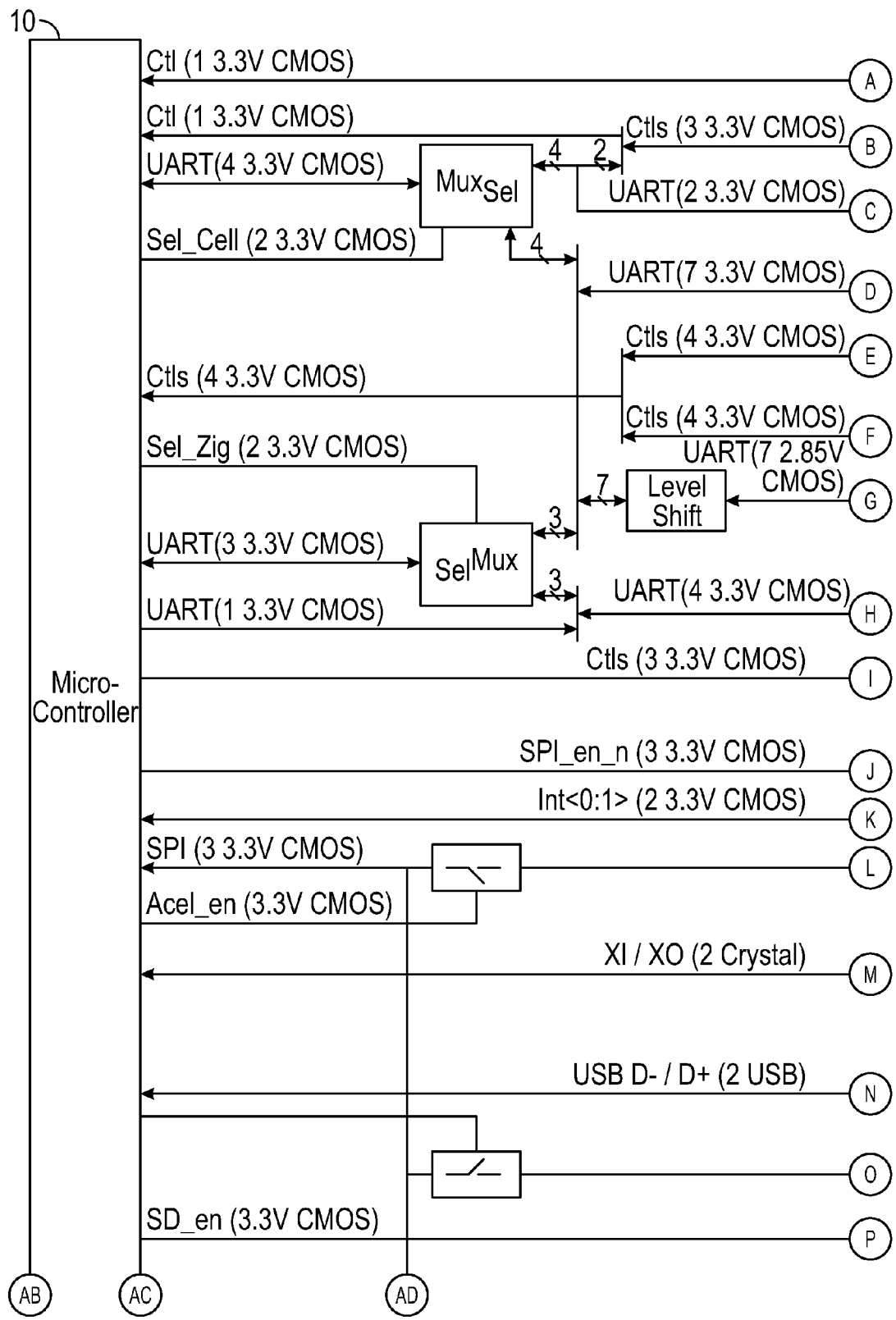
FIG. 1 illustrates a block diagram showing components of an SIR implementation according to the description.
Figure 1:
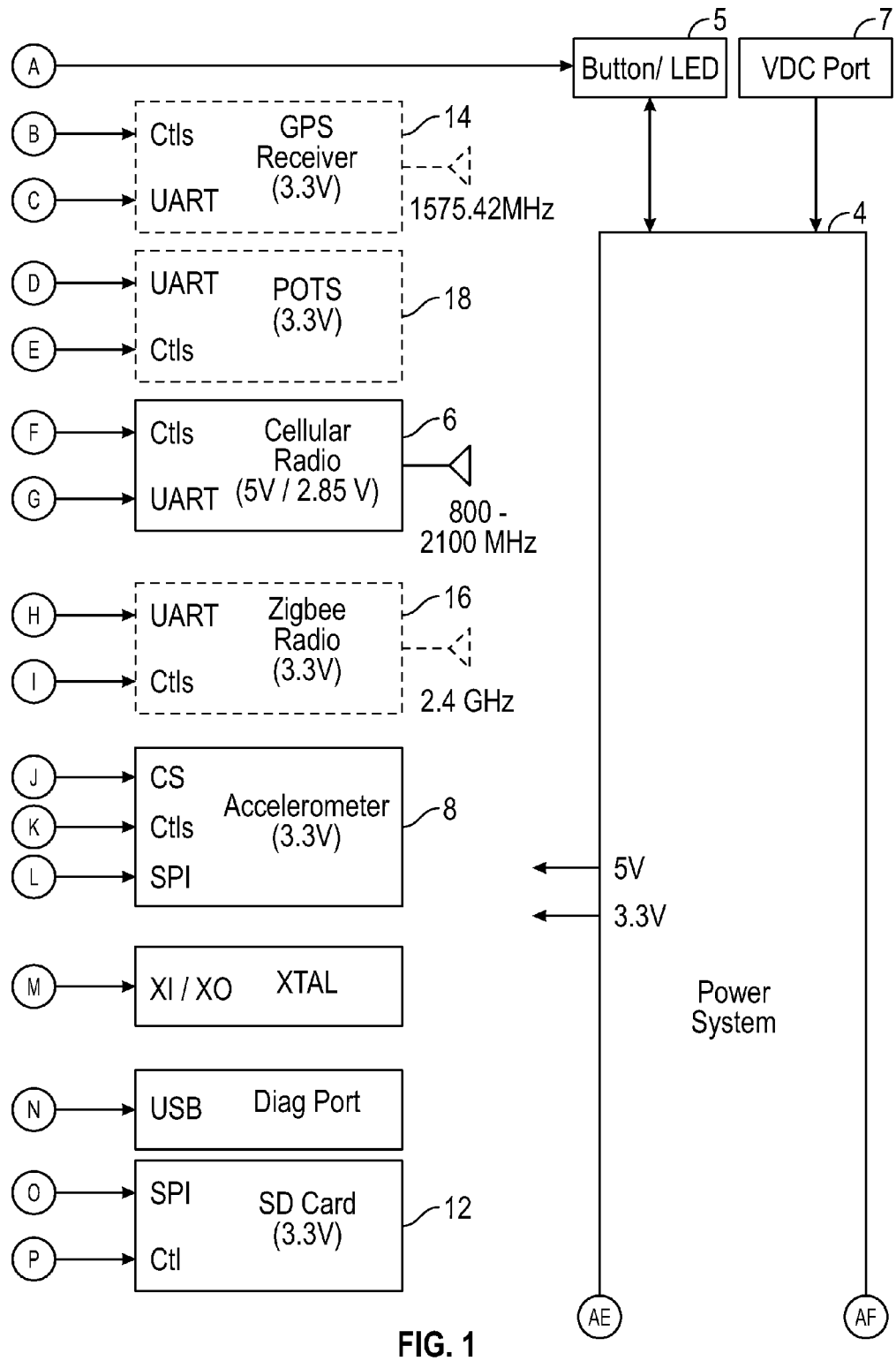
Figure 1:
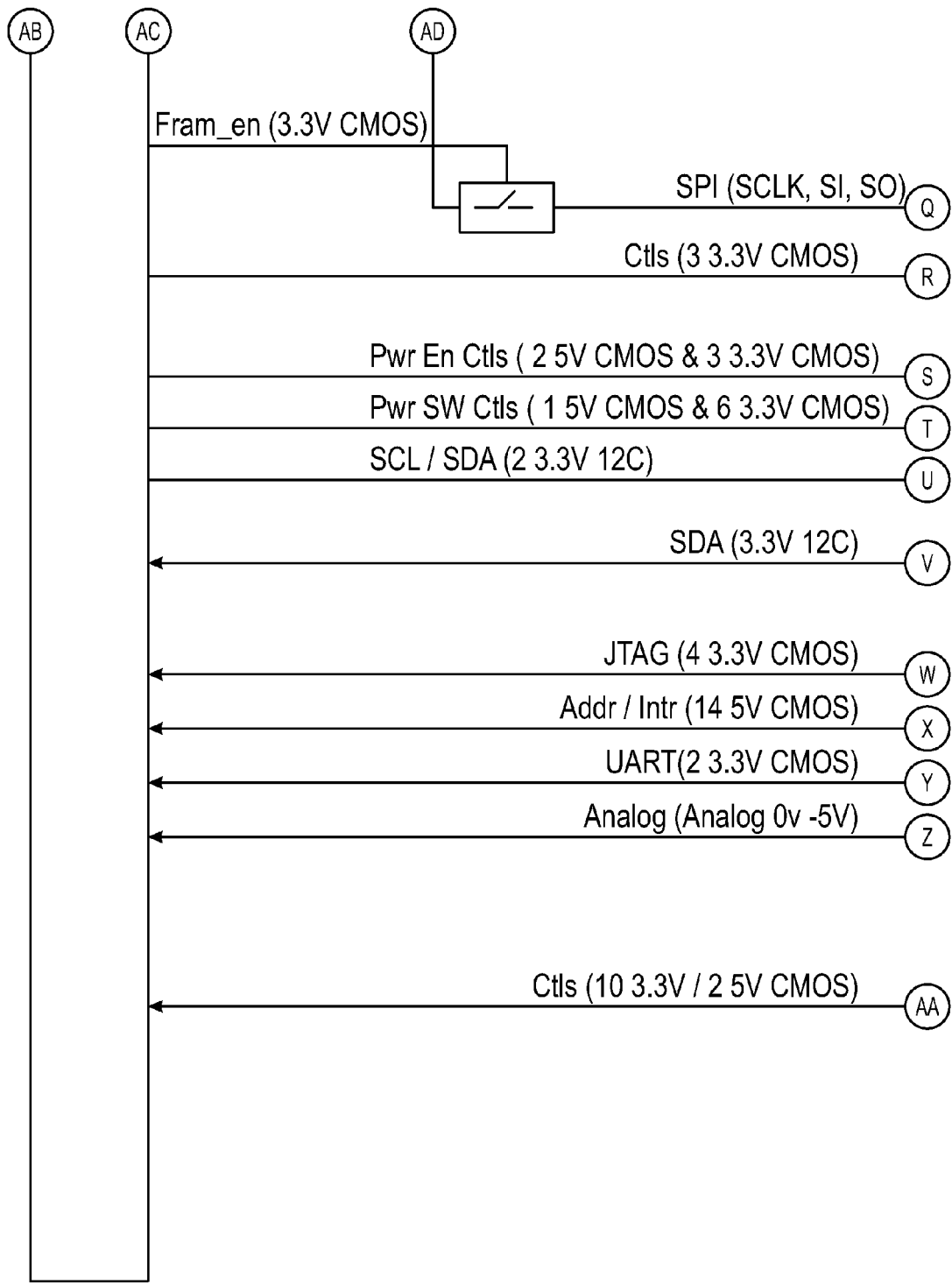
Figure 1:
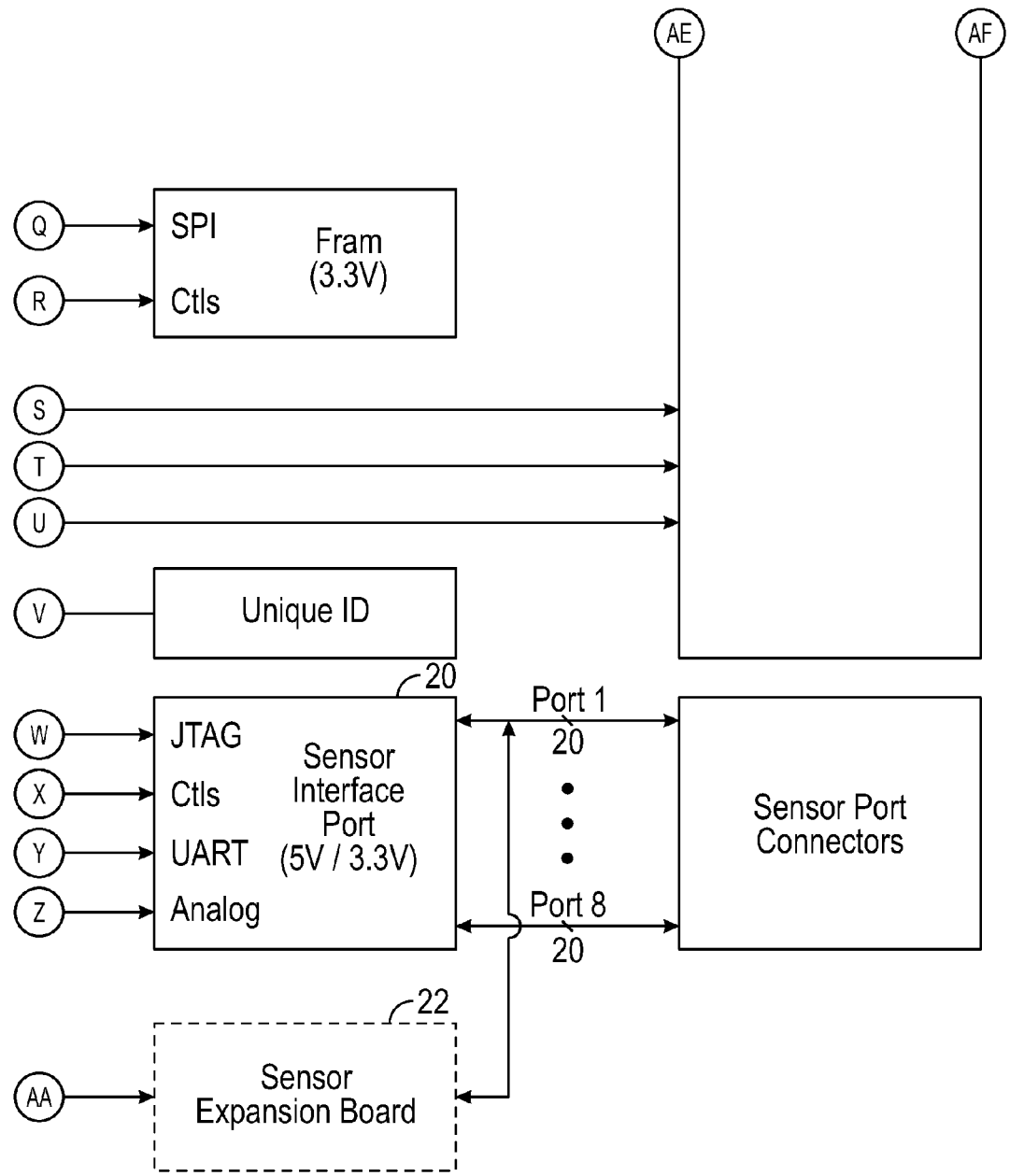

A logical block diagram of aspects of the SIR architecture is shown in FIG. 1. This diagram is not representative of the entire functionality of the SIR but provides a reference for describing the SIRs sensing and communication capabilities. The SIR embodiment includes various logical functioning blocks including: a Micro-controller 10; a Power System 4; a Sensor Interface Port (SIP) 20; a Cellular Radio (optional) 6; an Accelerometer 8; a Non-volatile Memory 12; a GPS Radio (optional) 14; a ZigBee Radio (optional) 16; POTS (optional) 18; and an optional Sensor Expansion Board 22. The illustrated SIR embodiment supports cellular long haul communications and therefore includes a cellular radio for communications between the SIR and remote hardware and software systems. Short haul communication options however may be more practical alternative for sensing applications that require multiple SIR devices to communicate to remote hardware and software systems. In such applications, having dedicated cellular communications capabilities for each SIR would be an expensive and less than optimal solution. Accordingly, the SIR embodiment may also include POTS and/or ZigBee radio capabilities and if needed, separate GPS receivers for SIR embodiments that do not include cellular communications but that require GPS capabilities.

Additional components shown in the functional block diagram include the diagnostic and VDC ports 7, and the power button and LED indicator 5. The diagnostic port can be used to retrieve data from the SIR device for diagnostic purposes and can also be used to load firmware into the device. The VDC port acts as a DC power supply source to the device and also charges the internal battery when connected. The power button and LED indicator informs the user when the device is initially powered up. In order to conserve battery life the LED indicator will not remain on. It will be turned on when the power button is pushed, to indicate the device has been powered up, but it will be shut off after a short time period to conserve battery life.

Figure 2:
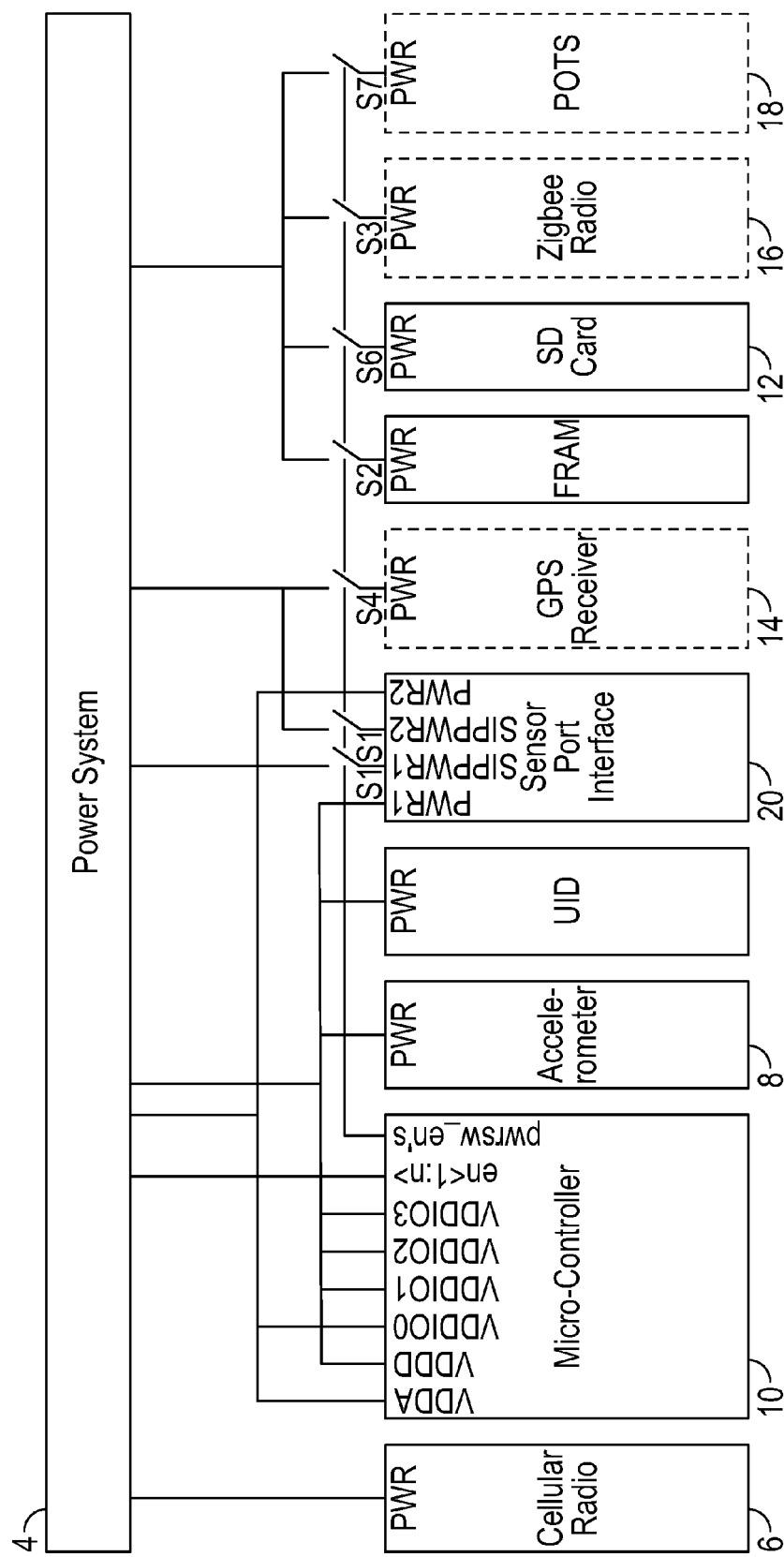
FIG. 2 is a power domain architecture block diagram.
Figure 3:
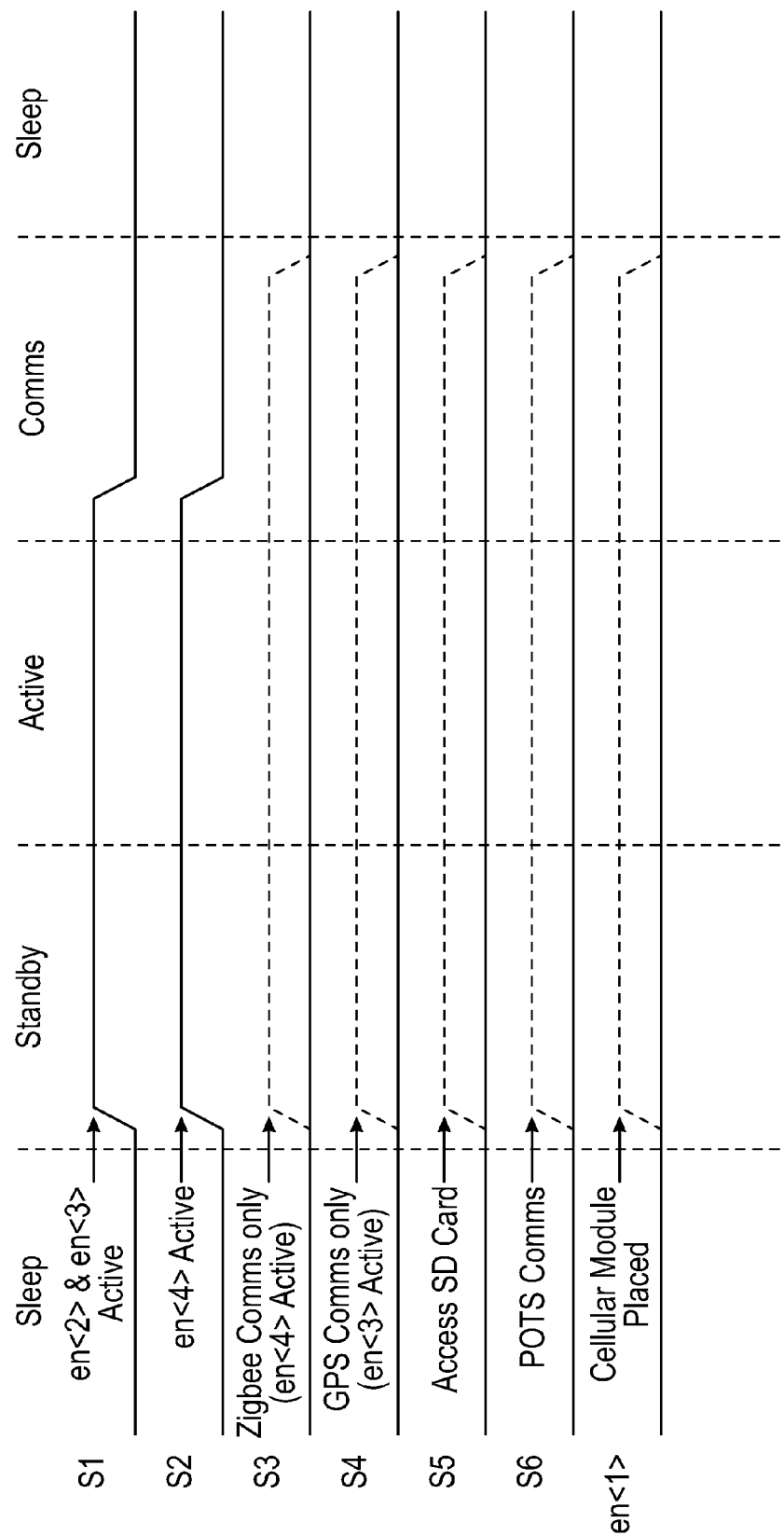
FIG. 3 illustrates a timing diagram describing the process of providing power to the SIR.

The SIR power system design includes 3.3V and 5V supply voltages. The power supply domain diagram is shown in FIG. 2. The power system block is supplied by either an internal battery or through an external DC port. The DC input voltage is expected to be provided by an adaptor that produces a 5V output nominally. The power system block contains a battery charger, a fuel gauge, and multiple regulator components. These components generate the main supply voltage levels that are distributed to all the blocks in the system. Removing power from a block is performed by either disabling a regulator or by disabling a power switch that connects a regulated supply to the block. All blocks can be powered down except the micro-controller 10. The micro-controller 10 must be powered at all times since it contains the Real-Time-Clock (RTC) used to generate the time based interrupts required for proper SIR operation. The micro-controller 10 is also responsible for setting up the signal interfaces properly between powered and unpowered blocks.

A timing diagram describing the power supply sequence is provided in FIG. 2. The timing diagram includes the power supply control signal states with respect to the mode of operation. If a block is to be powered up the supply will be connected when transitioning from sleep mode to standby mode. The system remains in standby mode until all the supplies and signal interfaces have stabilized. If a block will not be used its supply will not be enabled and the block remains unpowered. These scenarios are designated in the timing diagram by text associated with the signal waveform.

As mentioned, all blocks that will be used in the current mode sequence are powered up during standby mode. Once the block supply levels have stabilized and the signal interfaces are properly set, the system is ready to transition to the active mode. During active mode not all blocks will be functional. Only those blocks that are performing operations will be enabled. The enabled blocks will consume active current while the disabled blocks will consume standby current. Once a block has completed its operation it will be disabled and the next block in the chain will be enabled. This process continues until the cycle completes and the system returns to the sleep mode. This SIR power strategy minimizes the current consumed and saves on battery life but it requires the sequence of events to be timed properly. Accordingly, the blocks can be powered up and enabled during standby mode and remain enabled until all operations have been completed.

Figure 4:
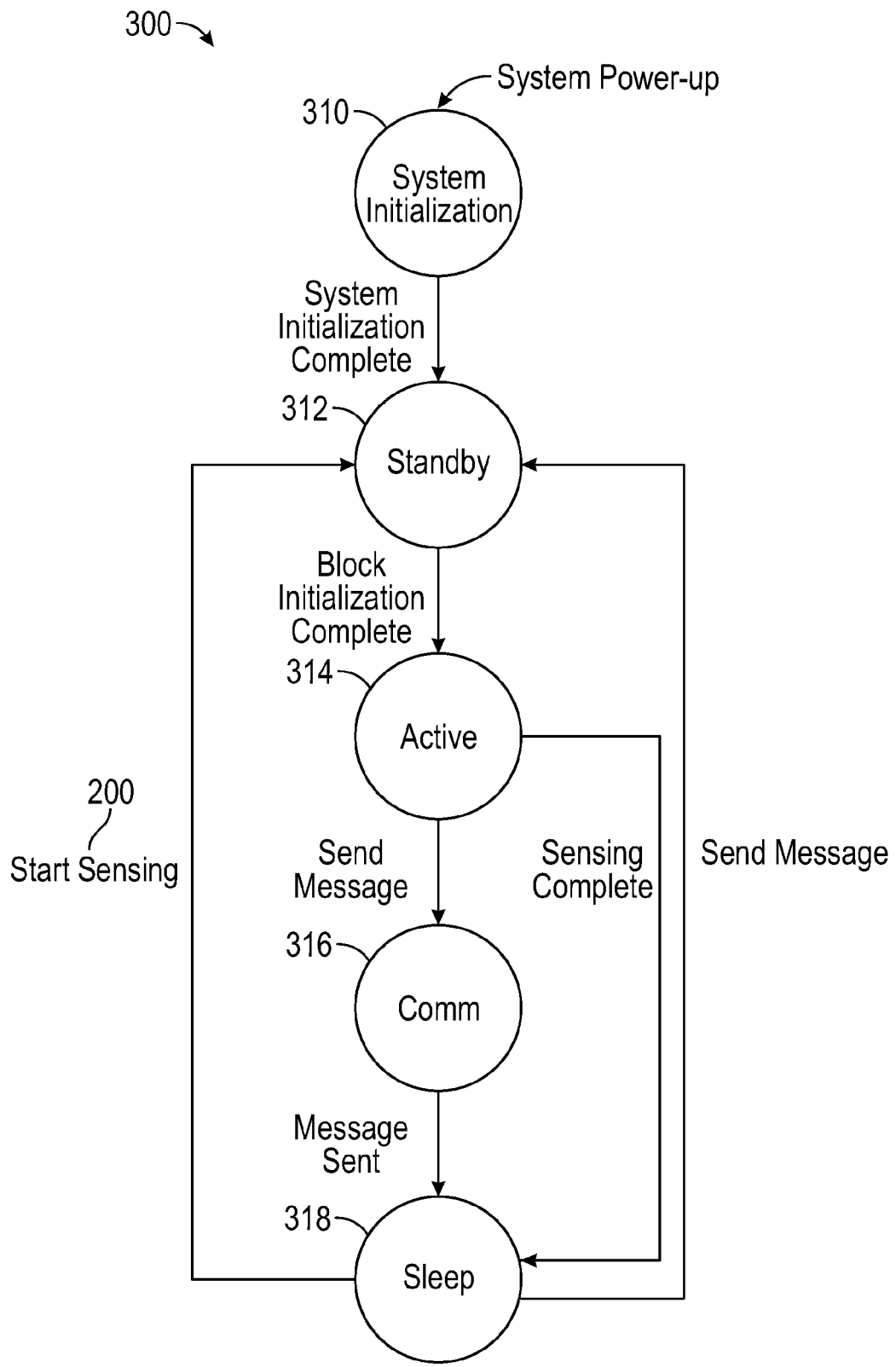
FIG. 4 illustrates a preferred SIR mode or state transition diagram.

SIR operation is governed by one or more software processes 300 operating on the micro-controller 10 to place the SIR in one of several operational modes. Exemplary and preferred operational modes include: System Initialization; Sleep; Standby; Active; and Communication. A preferred SIR mode transition and state diagram is shown in FIG. 4.

System Initialization 310—During system power-up the block power up sequence will be controlled and the pin interface states will be set in order to ensure the SIR system powers up safely. SIP 20 communications configuration will also be performed during the initial system power up. All these operations occur during the System Initialization 310 mode. After all system initialization operations 310 have been completed the micro-controller 10 will instruct the SIR system to take a sensor reading and notify remote hardware and software systems and provide powered up status information and the results of an initial sensor 200 reading.

Standby Mode 312—Standby mode 312 is intended as a transition mode between sleep mode and active mode. During standby mode 312, only necessary operations such as powering up and enabling blocks are performed before entering active mode. Once all the necessary setup operations are complete the micro-processor will direct the system to enter active mode 314 where pre-defined operations are performed. No data processing or communications need to occur during standby mode 312.

Active Mode 314—During active mode 314 the sensor data is acquired and processed and any necessary setup required before performing long or short haul communications is performed. During this active mode 314 the micro-controller 10 controls SIR block enabling and disabling sequence so that the current consumed is minimized. For example, while the sensor data is being acquired, it is preferred that the other SIR blocks may be disabled. Then, once the sensor data is acquired and processed, the SIP 20 will be disabled and other related blocks will be enabled as needed to continue the flow of data. In the low power mode, it is preferred that no wireless communication occur during this mode.

Communication Mode 316—The communication mode 316 is entered whenever short/long haul communications are required. Currently this type of communication is performed infrequently in order to conserve battery life. The events where the communication mode 316 will be executed are; long haul communications, short haul communications, and retrieving GPS information.

Sleep Mode 318—The current consumed by the SIR device is the lowest for the sleep mode 318 of operation. Only those blocks that are required for control and interrupt detection will remain powered up. These blocks will be powered up but they will be in a low current sleep mode 318. The micro-controller 10 continues to monitor interrupt signals and maintain RTC functionality while in sleep mode 318 and the accelerometer can still detect movement while in sleep mode 318. Therefore, the system maintains the necessary functionality while minimizing the current drawn from the battery thereby maximizing battery life. The power supplies to all other blocks are disconnected to eliminate current consumption from these blocks while in the sleep mode 318. Before entering into sleep mode 318 the micro-controller 10 must set the pins states so that current consumption is not inadvertently consumed when the power supplies are disconnected. For example, if one of the micro-controller 10 outputs is driven high and is connected to an input of a powered down device, the device will consume current through the input protection circuitry. This could be a significant current draw so it is vital that the micro-controller set all pin states correctly before the deep sleep mode is entered.

Mode Transitioning—Moving from mode to mode depends on completing the previous operation or receiving an interrupt. Time based interrupts are interrupts that are predefined and are used to transition from one operational state to another. For example, the block power up time may be used to set an interrupt that notifies the micro-controller 10 the block has had sufficient time to power up and the next operation can be executed. The accelerometer interrupt notifies the micro-controller 10 that the SIR has been moved. The micro-controller 10 will process this interrupt and initiate the necessary operations that results in sending a notification message to remote hardware and software system. The actual sequence of operations depends on the current operating mode.

The SIR also includes a strategy for conserving power. The SIR power conservation strategy will employ disconnecting block power supplies and putting devices into sleep mode in order to minimize the current consumed by the SIR. Special care must be taken to control the block interfaces properly before the power supplies are disconnected. All inputs to powered down blocks must either be driven low or tri-stated in order to ensure the input protection diodes are not forward biased and consume current. All inputs of powered up blocks being driven by outputs from an unpowered block must be disabled to prevent a floating input from consuming unwanted current. The micro-controller 10 will set all block interfaces so that these requirements are satisfied.

The SIR architecture and operation is customizable and particularly well suited to low power sensing applications. As an example of an exemplary sensing application, the SIR is deployed to monitor one or more assets in an unpowered environment and isolated environment for a prolonged period. One or more sensors 200 are functionally coupled to the asset and each sensor 200 having a SIR compatible communication capability is coupled to the SIR at one of the plurality of the sensor coupling ports 25. Further, because different assets and environments may require different sensors 200, the coupled sensors 200 could be any variety of sensors 200 such as temperature monitors, door monitors, voltage monitors, current monitors, tank level monitors, or other sensors 200 depending on the application and the asset and/or environment monitored. During SIR deployment, the SIR (i) operates a stored software process to systematically initiate receipt of sensing data, or respond to sensor driven interrupts, via at least one of the sensors 200 coupled to a sensor coupling port 25 and (ii) relays the sensing data to a remote location via wired or wireless communications and/ or alternatively responds with a predetermined action based on programming stored within the SIR micro-controller 10 memory.

Figure 5:
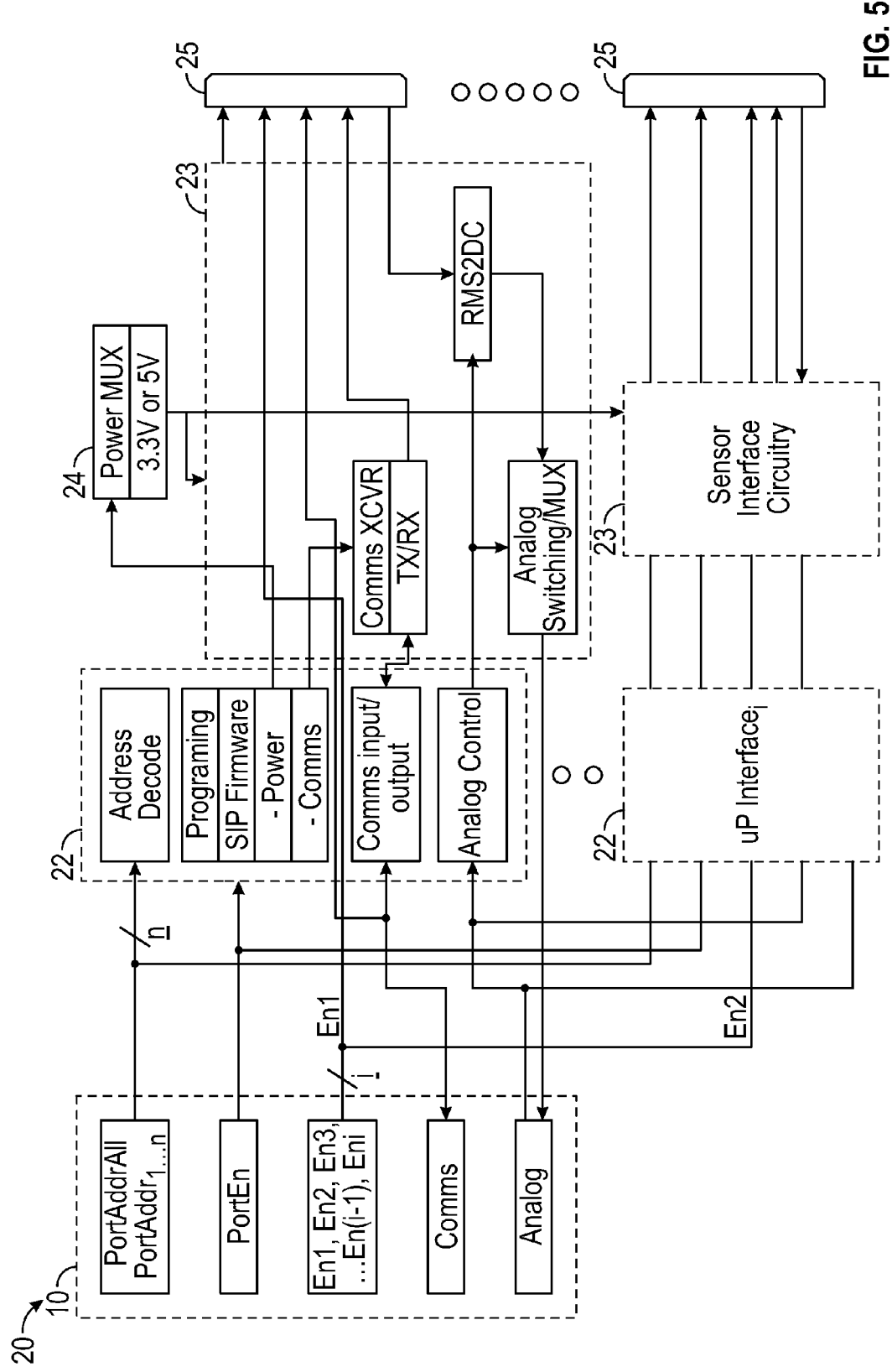
FIG. 5 illustrates a block diagram of aspects of the connection between the micro-processor 10 and the SIP 20, including the interface 22, the sensor interface circuitry 23, and the sensor coupling port 25.

FIG. 5 illustrates a simplified logical block diagram of aspects of the architecture of the Sensor Interface Relay (SIR) that facilitate multiple communication standards capability and power saving strategies. The preferred SIR includes at least one central processing unit coupled to memory, or more preferably, a micro-controller 10 in functional communication with at least one Sensor Interface Port (SIP) 20. A SIP 20 includes a plurality of uniquely addressable and programmable interfaces 22 capable of functional connection and communication with the micro-controller 10; and peripheral sensor interface circuitry 23 that converts the programmable interfaces 22 inputs/outputs to preferred serial communications standards (e.g. RS232/RS485) common to sensors 200 or to alternate sensor communications based on analog signals such as AC Voltage, Analog DC voltage and analog resistance. Associating each SIP interface 22 and associated sensor interface circuitry 23 with a sensor coupling port 25 enables the SIR to provide multiple sensor couplings having multiple communications capabilities and while employing power saving strategies for the entire SIR system.

The SIR architecture facilitates power management strategies and selective power gating to turn on/off power to sensor ports 25 to minimize power consumption. For example, in certain sensing applications, some sensors connected to the sensor ports 25 are not required to be on continuously. In such cases, the SIR architecture and implementation allows powering down these sensor ports 25 and only turns them on when needed. The power management is independent for each sensor port 25 and can be programmed to turn on at different times further adding to the flexibility. But, in a typical sensing application, each of the interfaces 22 and its associated sensor 200 will be sequentially enabled to receive sensor 200 readings and save power.

Figure 11:
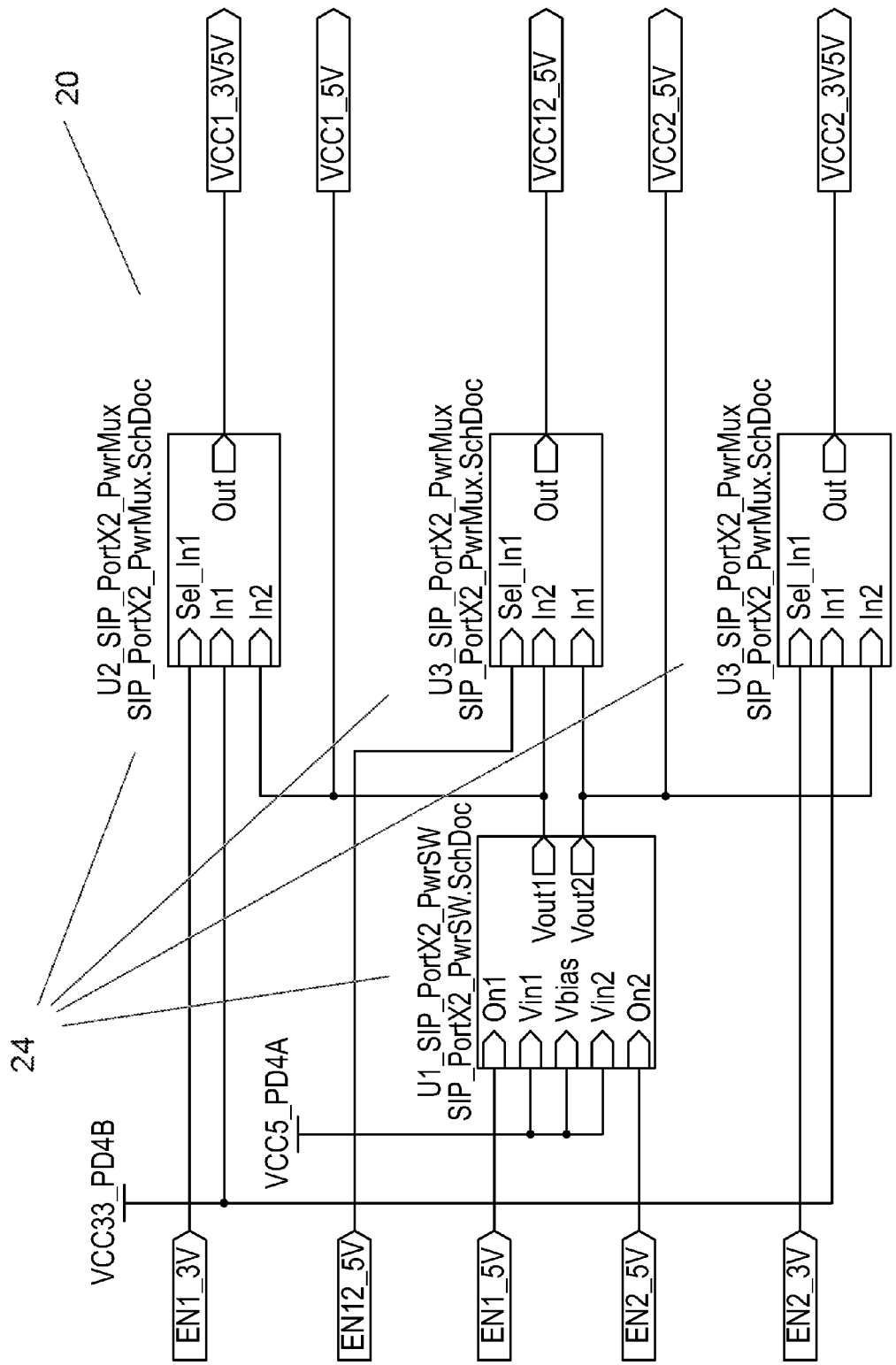
FIG. 11 is a schematic of the power switches and multiplexers inside the SIP block that are controlled by the interface sensor port configuration programming stored within firmware.

The SIP 20 is coupled to the 3V (nominally 3.3V) and 5V power supplies generated in the SIR power systems block 4. The 3V and 5V supplies power the programmable interfaces 22 and peripheral sensor interface circuitry 23 of the SIP 20, which in turn provides 3V and 5V power supply outputs options to power sensors 200 coupled to the sensor coupling ports 25. FIG. 11 shows more detail of the power switches and power multiplexers 24 inside the SIP 20 block that are controlled by the interface 22 sensor port configuration programming stored within firmware. This allows the SIR to interface with and power sensors 200 that require either 3V or 5V being applied to VCC1, VCC2, and VCC12 depending on the inputs EN1, EN2, and EN12 as shown in the truth tables 27 of FIG. 12.

Figure 6:
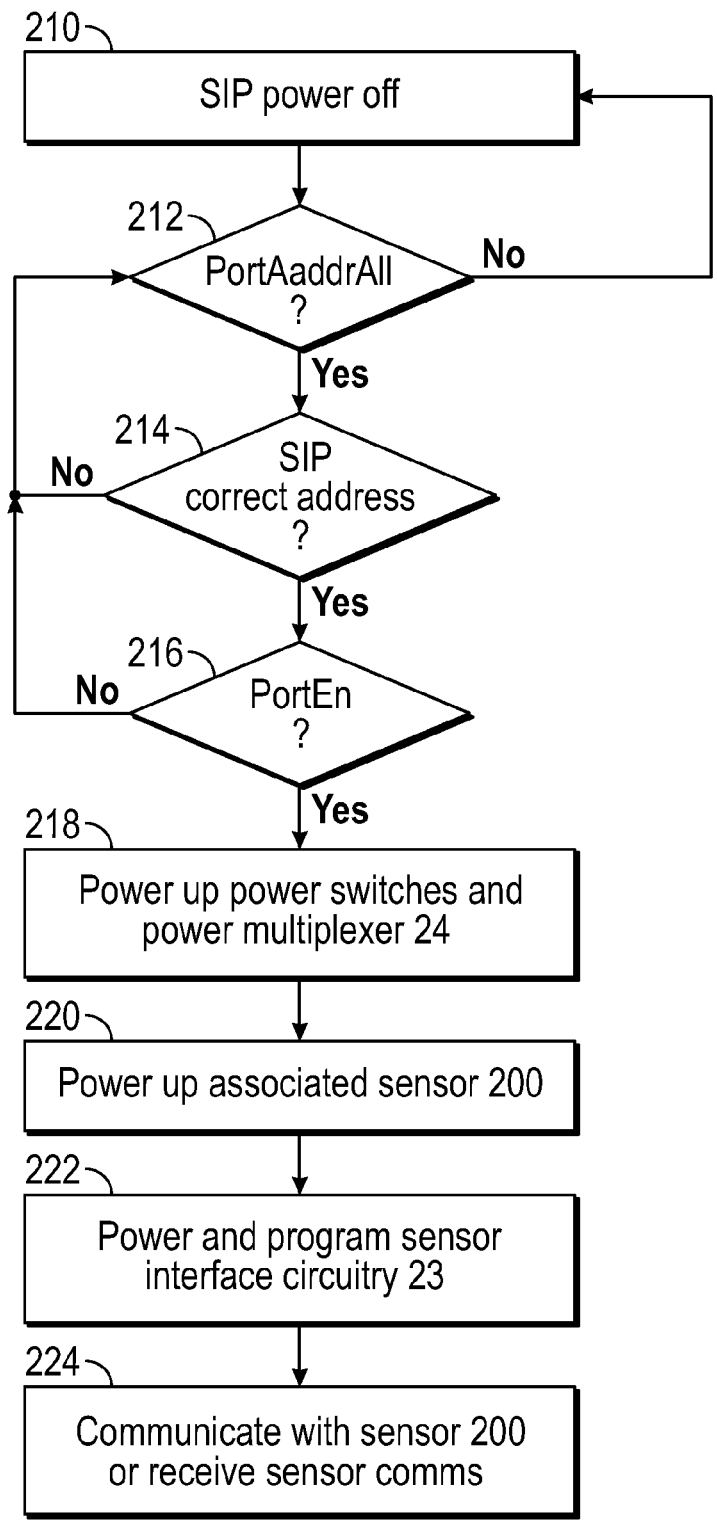
FIG. 6 illustrates a process for sequentially enabling an SIP interface 22 and the associated sensor interface circuitry 23 for a sensor coupling port 25.

The SIR and SIP 20 architectures allow multiple sensor coupling ports 25 to be powered at the same time or more preferably for power-savings, the plurality of sensor coupling ports 25 are powered one at a time or sequentially. As one example, in a low power operation, the micro-controller 10 will wake, power up and program the SIP 20, sequentially perform sensor 200 readings, and then power down the SIP 20. More particularly, and with reference to FIG. 5 and as shown in FIG. 6., the micro-processor 10 will send a first enable signal (e.g. "PortAddrAll") that powers all the sensor interfaces 22 with a single signal 212. The micro-controller 10 then uniquely addresses one of the plurality of interfaces 22 (using "PortAddr$_{0 \ldots n}$.") 214 and sends a second enable signal ("PortEn") 216 common to all the interfaces 22. The combination of a correct unique address on common address lines ("PortAddr1, . . . , PortAddrn") and second enable signal ("PortEn") enables the selected interface 22 to subsequently enable 218 its associated power switches and power multiplexer 24 and subsequently initiate programming 222 of the peripheral sensor interface circuitry 23 to select or program the sensor coupling port 25 communication capabilities. The micro-controller 10 then will initiate communications 224 with the coupled and associated sensor 200, and/or receive sensor 200 readings, and relay it to a remote hardware and software system. After a sensor 200 reading is taken, the peripheral sensor interface circuitry 23 will be powered down and then the power switches and power multiplexer 24 is also powered down. Any SIP that was powered by the PortAddrAll signal will be powered down if the PortAddr0 . . . n 214 signals do not match the SIP's unique address when the PortEn 216 signal is sent.

Moreover, a plurality of third enable signals (e.g. "En1 . . . i"), one each respectively associated with each sensor coupling port 25, are available if needed based on the sensor 200 requirements. The plurality of third enable signals provides the capability to interface with sensors that may perform a specific communication standard but also allows the interface to be enabled or disabled with a separate signal. For example, an analog sensor 200 or associated passive component may require significant time to settle or reach a steady state condition. In such conditions, the SIR can assert a third enable signal, e.g. Eni, to enable/power up the sensor 200 and then subsequently employ the process illustrated in FIG. 6 and described above to uniquely address and enable the SIP 20 and second enable signal, "PortEn", to communicate with or read the sensor 200 previously enabled/powered by the third enable signal. Yet another example of a sensing application using the third enable signal comprises a situation when a sensor is to be constantly powered or powered for a significant time for optimum or proper sensor operation. The third enable signal allows the SIR to power or enable the associated sensor 200 only rather than also powering the SIP 20.

Figure 7:
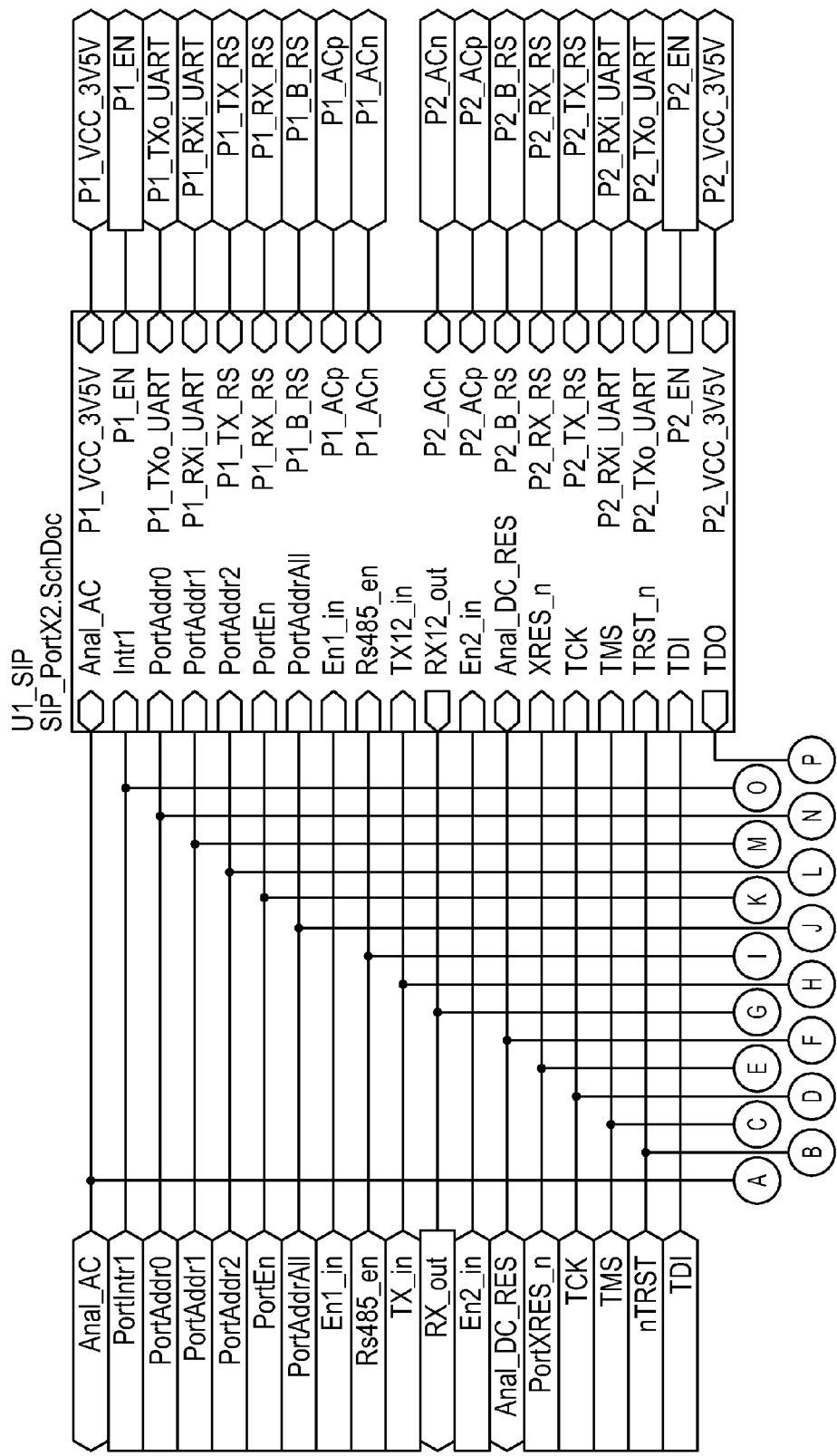
FIG. 7 illustrates a preferred embodiment of an SIP 20 wherein the interfaces 22 share the addressing, and communications signals from and to the micro-controller 10.
Figure 7:
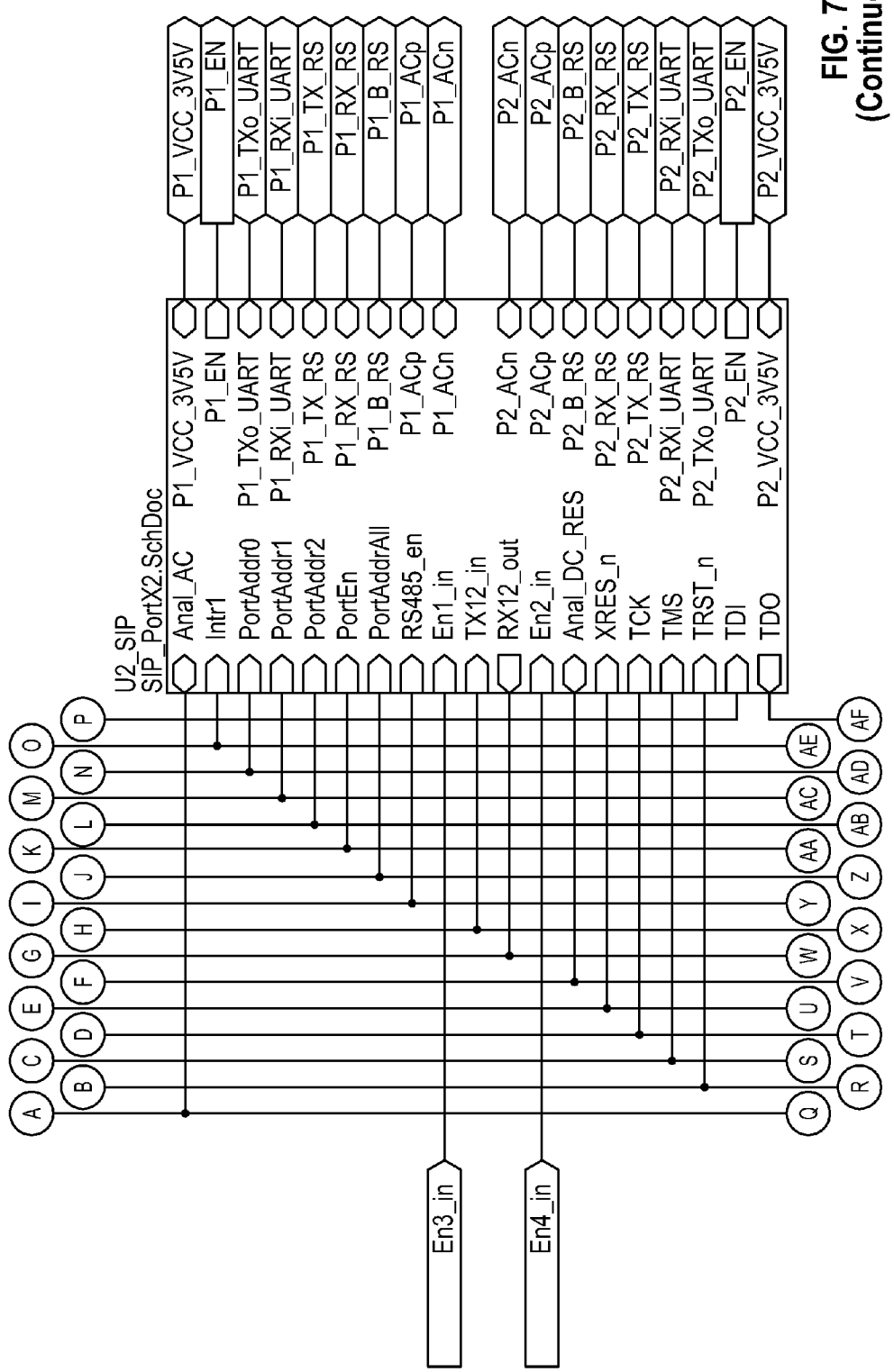
Figure 7:
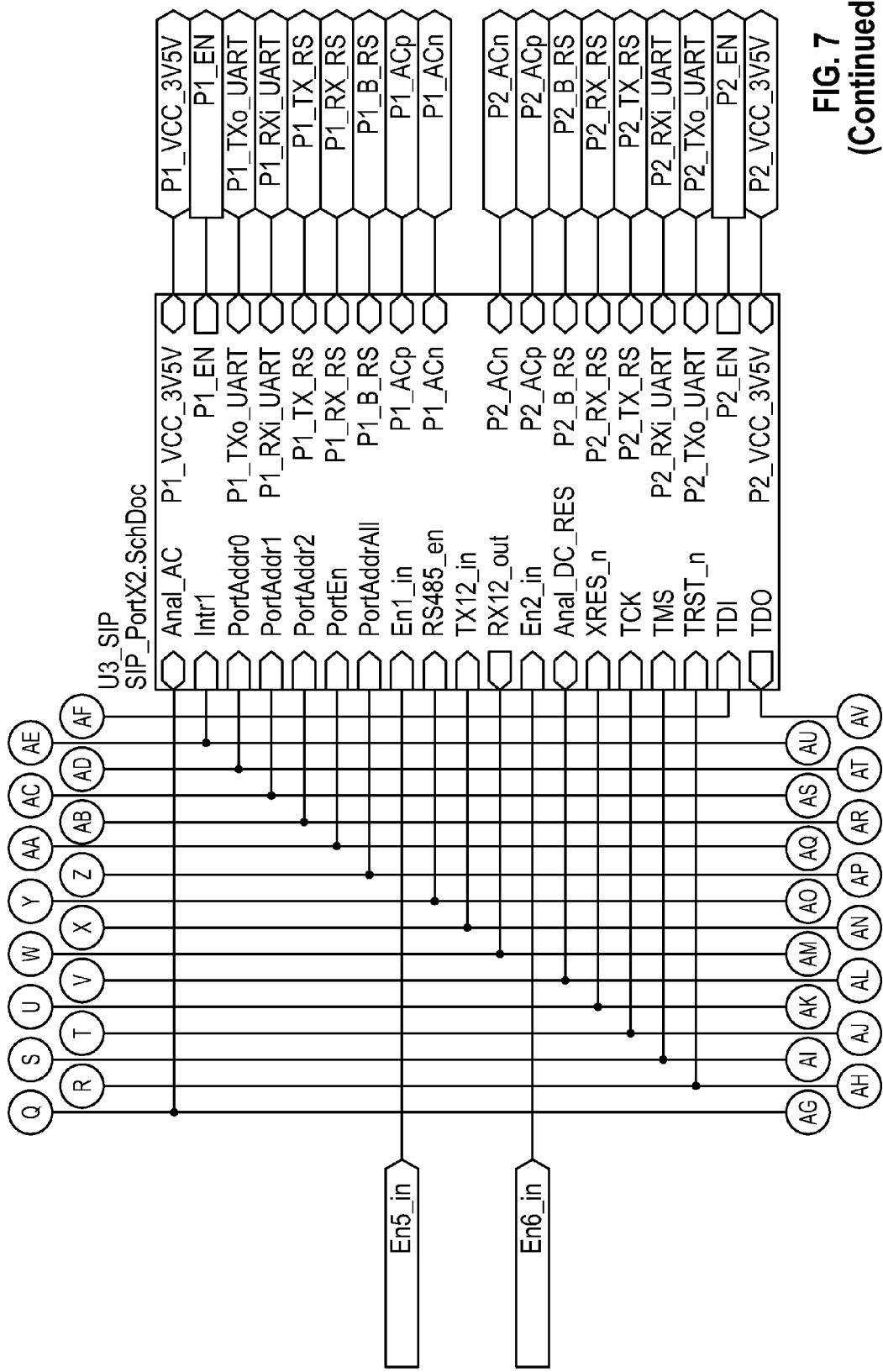
Figure 7:
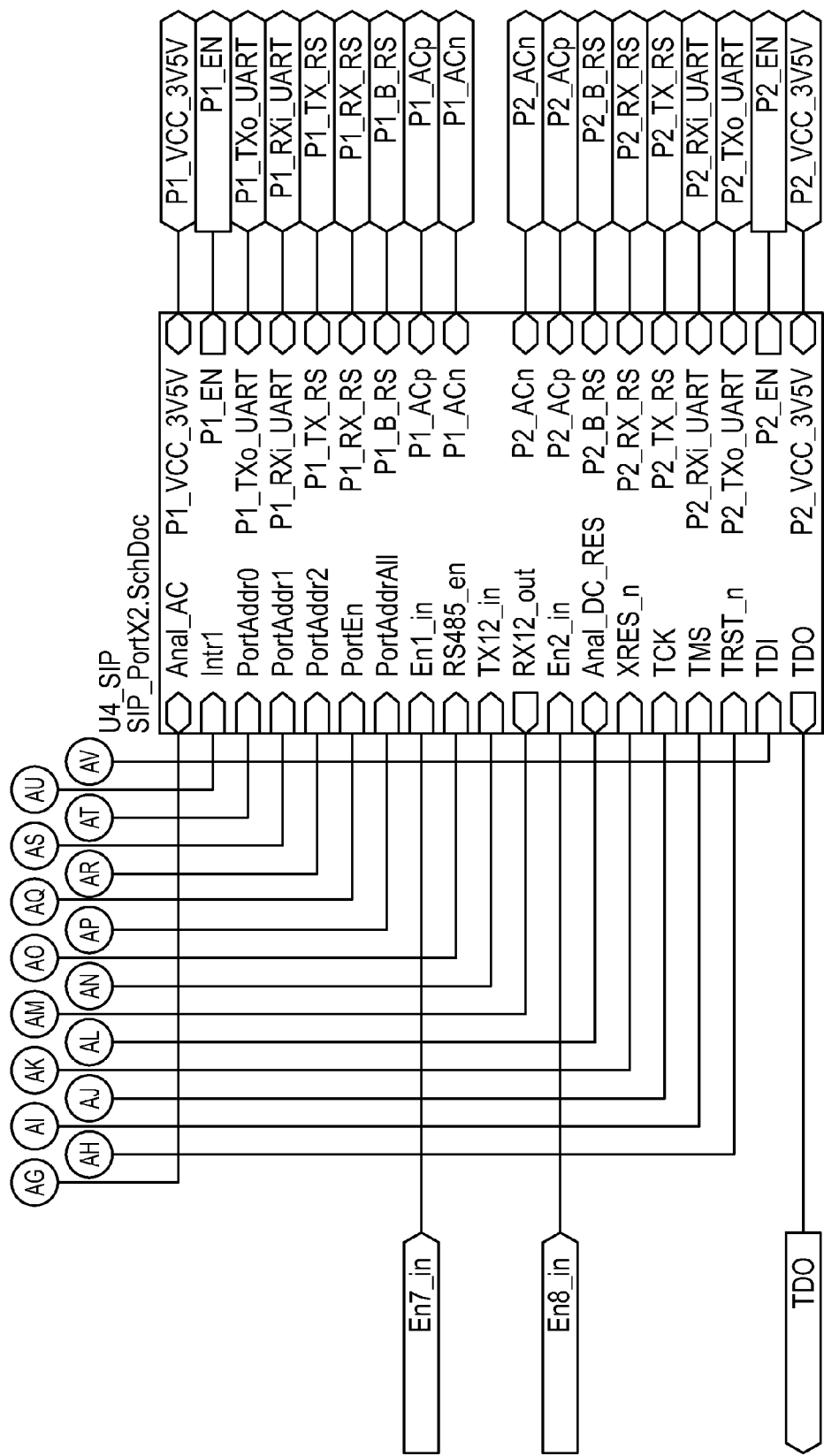
Figure 8:
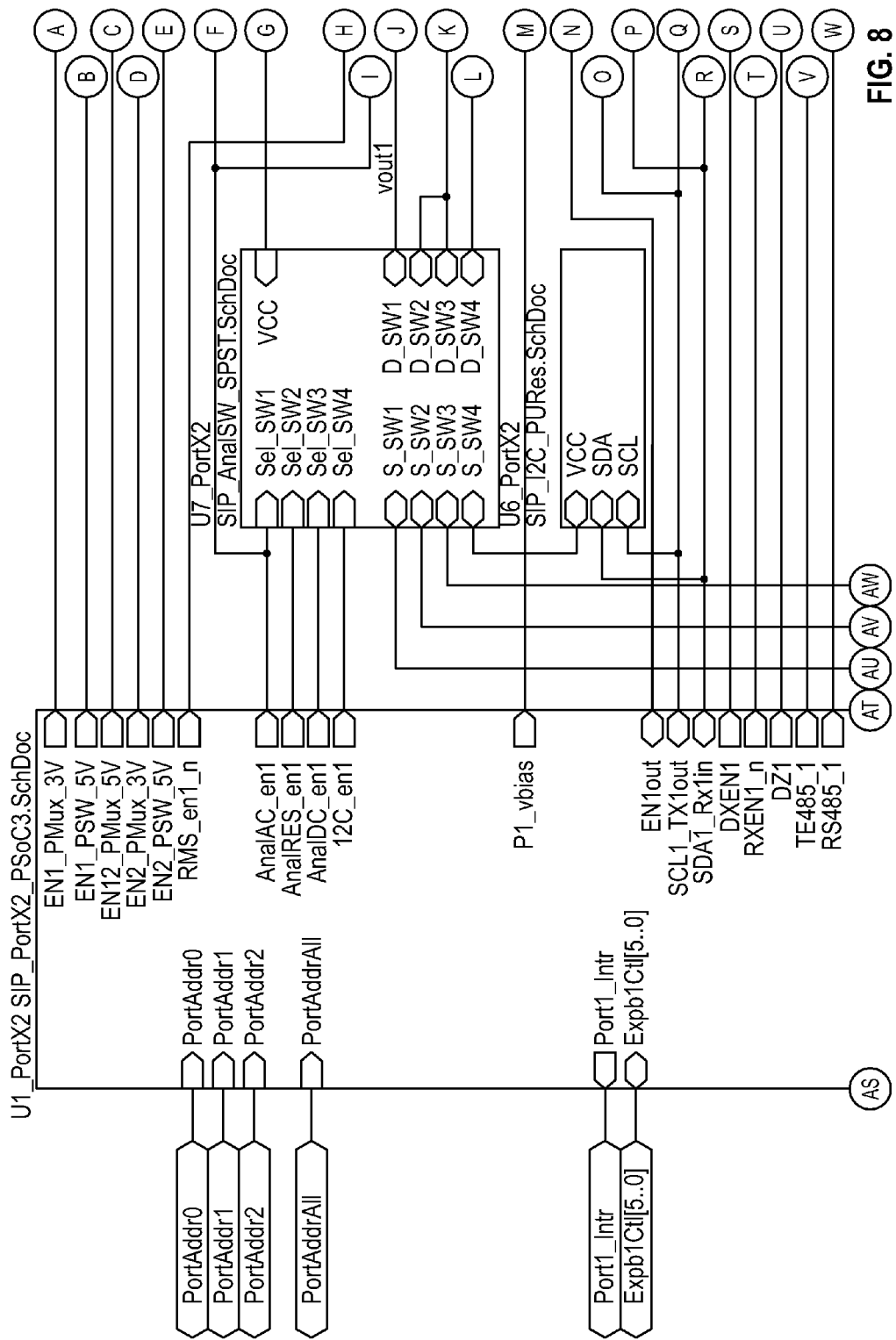
FIG. 8 illustrates greater detail of a preferred SIP 20 embodiment and includes sensor interface circuitry 23 in the form of a RS232/RS485 communications transceiver and an root mean square to direct current converter.
Figure 8:
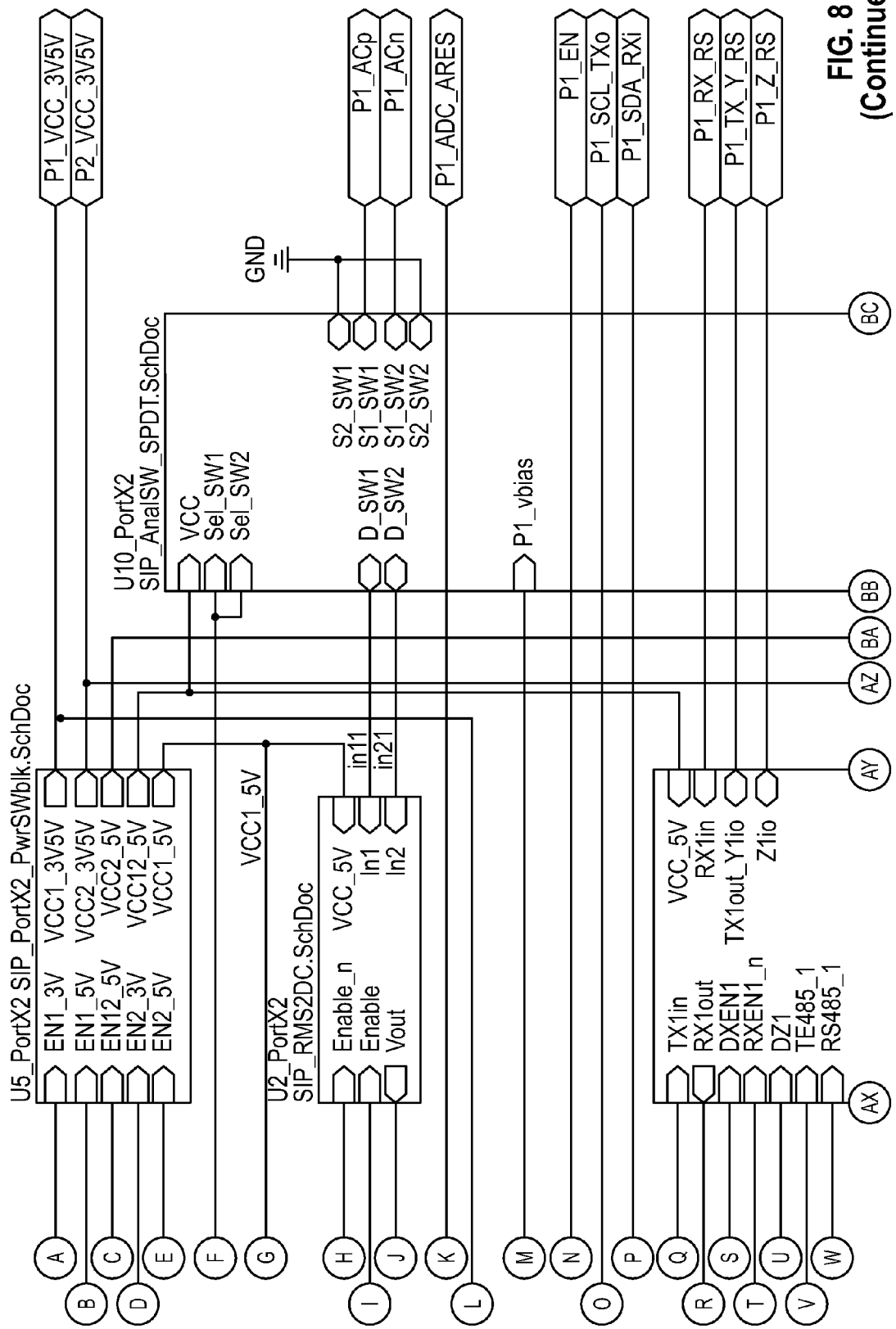
Figure 8:
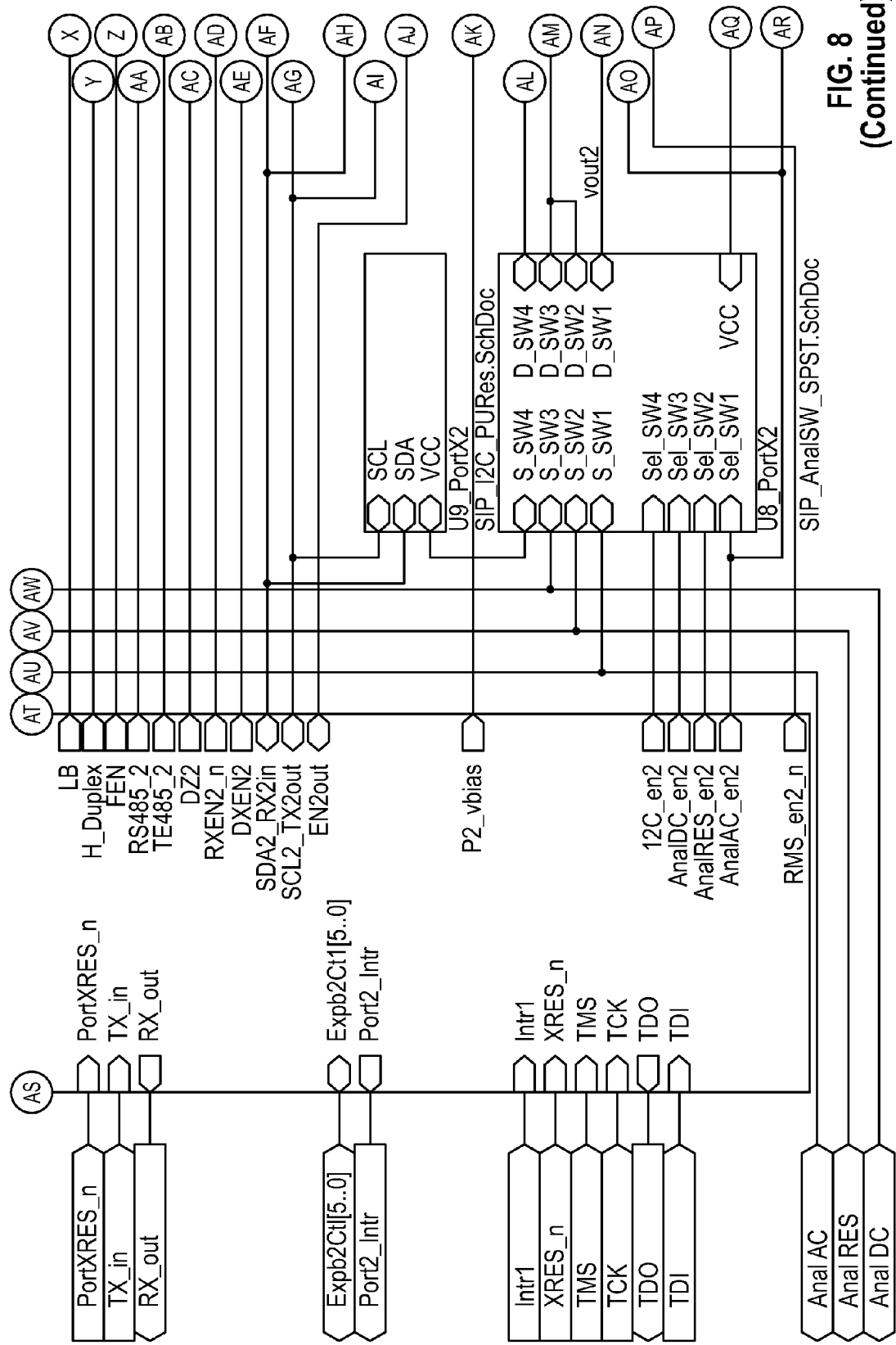
Figure 8:
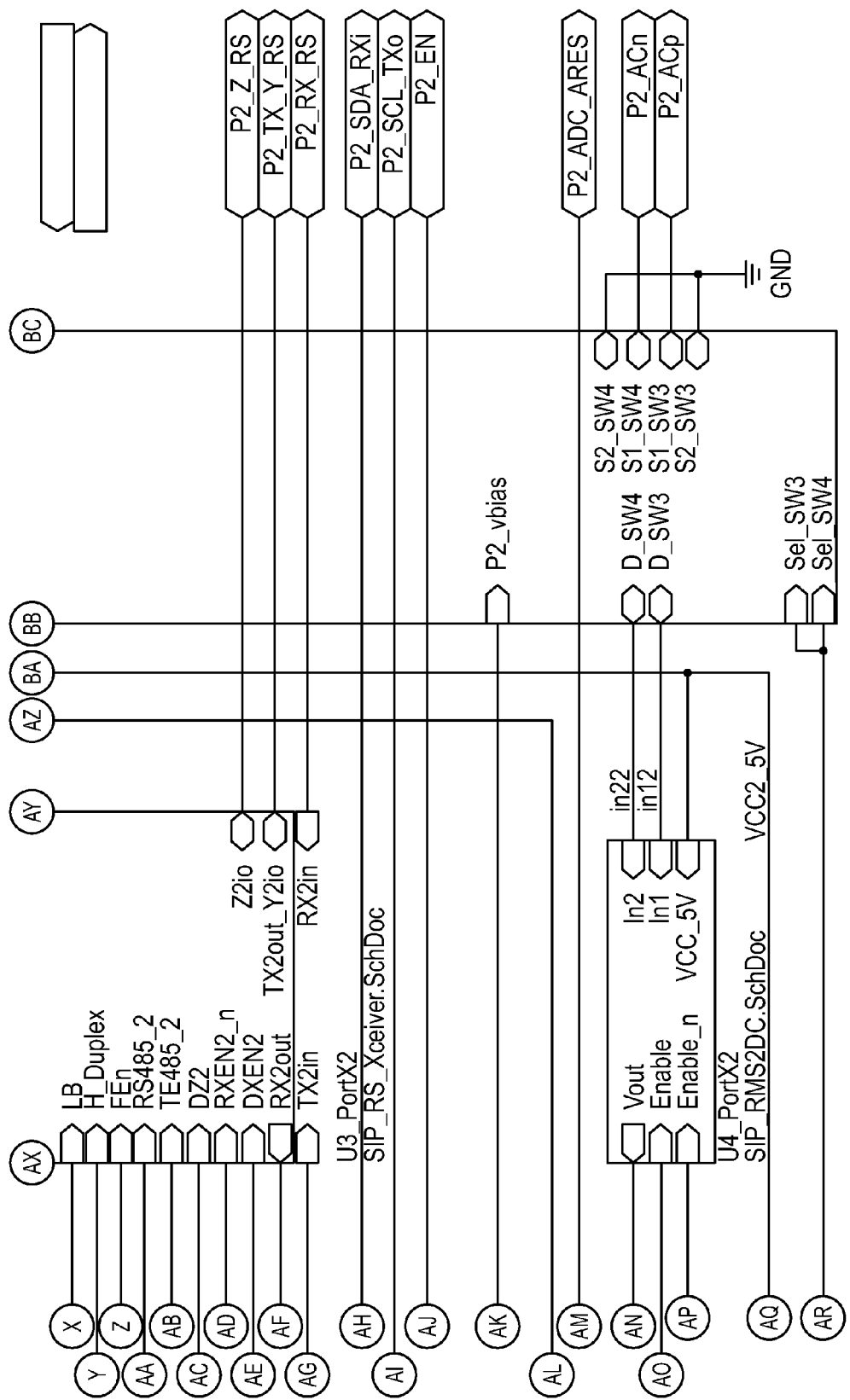

The hardware architecture of a preferred embodiment of the SIR, which includes the lower level block requirements for the various blocks in the architecture, is illustrated in FIGS. 7 and 8. The preferred embodiment is implemented with several integrated circuits (ICs), each having features facilitating certain functions or features of the SIP 20 and implement switching, logic, and communications functions and sensor connections. A preferred interface 22 of the SIP 20 embodiment includes a processing unit comprising an integrated programmable hardware and software IC solution that may be implemented with any number of discreet or integrated solutions capable of the disclosed features required. Features and functions of the SIP 20 may be implemented in discrete ICs implementing the various functions or in alternative solutions featuring higher levels of integration such as Field Programmable Logic Arrays, Field Programmable Gate Arrays, or micro-controller based solutions such as a Programmable System on a Chip (PSoC).

A preferred IC solution that accommodates the desired communications capabilities while minimizing power requirements includes a programmable computer system on chip (PSoC) 220 such as the Cypress Semiconductor CY8C5868, which performs many functions that include sequence of operations, digital and analog processing, and block power cycling. The PSoC5 device includes a large number of programmable IO's, programmable digital and analog resources, and it's interconnect matrix provides flexibility in connecting all resources together. The PSoC 220 includes support for programming, testing, debugging, and tracing hardware and firmware. Four interfaces are available: JTAG, SWD, SWV, and TRACEPORT. JTAG and SWD support all programming and debug features.

The SIP 20 interfaces with the micro-controller 10 and implements the programmable communications functions of the SIR as controlled by the micro-controller 10. Each of the sensor coupling ports 25 comprises an independently configurable and operable sensor coupling port 25 that can be configured in the field or at sensor deployment to work with a plurality of sensor electrical interfaces and communication standards. The SIR architecture also allows powering of the sensors 200 at any of, but not limited to, two different voltage levels. As a result, each of the sensor coupling ports 25 can be configured to a variety of sensor electrical interface communication standards and sensor power supply voltages. The sensor coupling ports 25 are configured through a Port Enable command sent from the PSoC5 which contains the desired port settings. These settings include voltage levels, pin drive modes, interrupt settings, protocol specific settings (addresses, clock speeds, baud rates), and any other relevant settings. These commands are typically only sent at system startup but can be sent at any time.

The preferred SIP 20 implementation includes multiple micro-controller based interfaces 22 coupled to the micro-controller 10. Each interface 22 in the SIP 20 couples to the micro-controller 10 and its associated sensor interface circuitry 23 to communicate with at least one externally connected sensor 200 using at least one communication standard selected from, but not limited to, RS232; RS485; UART (CMOS); I2C; Open Collector; Open Drain; Maxim 1-wire; Analog AC voltage; Analog DC voltage; Analog Resistance. The SIR architecture allows for the adoption of new communication standards based on the integral communication capabilities of the PSoC chosen for the SIP 20 and the available sensor interface circuitry 23.

The illustrated embodiment of an SIP 20 consists of four PSoC based interfaces 22 and supporting sensor interface circuitry 23 creating eight sensor ports 25 (port 1 through port 8). Each interface 22 controls and configures the power supply 24 and two sets of sensor interface circuitry 23, each set connected to one sensor coupling port 25. For example, a first PSoC based interface 22 controls ports 1 and 2, a second PSoC based interface 22 controls ports 3 and 4, . . . etc. The interface 22 signals that communicate directly with the micro-controller 10 are: a plurality of port addressing signals (PortAddr0-2, PortAddrAll); port enable, reset, and interrupt signals (PortEN, PortXRES_n, PortIntr); UART signals (TX_in, RX_out, RS485_en); dedicated sensor enable signals (EN1_in, . . . , EN8_in); a dedicated analog signal line shared between the eight sensor ports 25 (Anal_IO); and JTAG signals. The three port addressing signals (PortAddr0-2) permit each PSoC based interface 22 to have a unique address. The interfaces 22 share an additional common addressing signal originating from the micro-controller 10, PortAddrAll, that powers/enables every PSoC based interface 22 while the micro-controller 10 uniquely addresses one of the interfaces 22 and enables one of the interfaces using PortEn to perform a sensing operation through one of the plurality of sensor coupling ports 25. The UART, analog, reset, and interrupt signals are also shared between all ports. The address bits determine which sensor coupling port 25 is communicating with the micro-controller 10 for various operations. The sensor data is communicated through the UART signals or the analog signal. However, the UART interface is not limited to only communicating sensor data. This interface can also be used to transfer configuration data or other information between the micro-controller and the SIP.

The JTAG signals are used for programming and debug purposes. This interface will be controlled by the micro-controller. The main micro-controller and the SIP micro-controllers have built-in JTAG programming circuits and provide JTAG pins to interface to a JTAG programmer device that is not part of the SIR. The JTAG programmer device plugs into the SIR via a JTAG port connector. The JTAG programmer also interfaces to a PC through which the main and SIP micro-controllers are programmed.

Programming the micro-controllers includes loading the firmware or the main system control functions as shown in the state transition diagram. It also includes loading the configuration memory that is used to configure the SIP interface standard and other configurations for sensor data processing, analysis and long haul communications. Each SIP is currently programmed (either through JTAG or boot-loaded through the diagnostic port) with the ability to support each of our current communication protocols. Each port is initially configured to be unpowered and can dynamically configured for a specific communication standard by receiving commands from the PSoC5

The sensor coupling ports 25 connect directly to the sensors 200. Due to the large number of communication standards being supported, a 12 pin connector is required to interface between the sensor coupling port 25 and the sensors 200. A sample sensor coupling port 25 to sensor pin breakdown is as follows: 1 pin: 3V or 5V sensor power supply; 2 pins: sensor ground supply; 2 pins: CMOS UART TX & RX, I2C SCL & SDA, Open Drain/Open Collector, CMOS, 1-Wire; 1 pin: Analog DC, Analog Res; 2 pins: Analog AC2DC; 1 pin: Sensor enable; 3 pins: RS232/RS485 RX, TX/A, B.

The port signaling standard chosen is defined by the system application. Knowing the system application allows the sensor port configurations to be stored in non-volatile memory within the SIP 20 so that it can be retrieved when needed. Each sensor coupling port 25 requires several port controls to be properly configured. The micro-controller 10 does not have enough pins to control each port separately. Therefore, the individual port controls are created inside the SIP block.

Sensor Interface Port Supported Signaling Standards—

The following section provides a brief description of the signaling standards supported by the sensor coupling port 25.

UART (CMOS)—

This signaling interface is expected to be used as a CMOS version of the RS232 signaling standard. Some sensors have been found that specify an RS232 protocol but use CMOS signal voltage levels. The SIO PSoC3 outputs are used for the TX and EN outputs so that the output power supply can be set to either 3.3V or 5V. The RX input is connected to a GPIO pin that has a fixed 5V supply. If a 5V sensor is connected to the port the GPIO will be configured for CMOS operation. If a 3.3V sensor is connected the GPIO input buffer will be configure for TTL input levels.

RS232 and RS485—

These standards are the real RS232/RS485 signaling standards. A component has been identified that converts a UART signal to RS232/RS485 levels. The component includes dual RS232 and RS485 transceivers so one component will be used for 2 sensor ports. Sharing a single device across two ports requires special handling to ensure the powered down port does not cause unexpected performance. The architecture takes this into account so no unexpected operation will occur. LTC2872 from Linear Technology is used to convert CMOS UART signals to RS232/RS485.

Analog Resistance—

The analog resistance communication simply implies that the sensor acts as a variable resistance. This type of sensor is read by applying a voltage to one end of the sensor and connecting the other end to an op-amp configured to detect the external resistance of the sensor. The op-amp output voltage corresponds to the current flowing through the resistive sensor. The op-amp output voltage is fed to the ADC where the output is translated to a specific resistance value. The PSoC device contains an op-amp and an ADC to perform the necessary operations.

Analog DC and AC-to-DC Voltage—

These signaling standards are similar to the analog resistance standard expect the op-amp is not required to create the ADC input voltage. For the analog DC signal the sensor produces the DC voltage level that is input to the PSoC5 ADC. The analog AC-to-DC signal is similar except an AC-to-DC converter component is used to convert the sensor generated AC voltage level to a DC voltage level before the ADC performs the translation.

Open Collector/Drain—

The open collector/drain signaling standard is implemented by programming the PSoC3 IO as a weak pull-up. This configuration places a 5 kOhm resistor in series with the pull-up driver which meets the open drain requirement.

Similar to the UART standard this standard is connected to an SIO pin so the supply level can be set to either 3.3V or 5V depending on the sensor supply level.

I2C—

The I2C signaling standard is similar to the open drain standard except for the pull-up resistance value. The PSoC3 device includes special I2C pins that implement the I2C protocol. External resistors must be placed on these pins in order to fully implement the standard. The power supply to these resistors can be set to either 3.3V or 5V in order to match the sensor supply.

FIG. 7 shows the contents of the SIR_PortX2 block shown in FIG. 6. The components contained within this block are: PSoC3 device; Power switch block; Analog RMS2DC converter; RS232/RS485 transceiver; Analog muxes; and I2C pull-up resistors.

The PSoC3 device controls the sensor coupling port 25 operation. The PSoC3 contains the firmware and the port configuration programming so that a ports associated sensor peripheral interface circuitry 23 can be set so a sensor 200 reading can be performed correctly. The power switch block 24 is composed of switches and muxes that supply the correct levels to the sensor and the port circuitry. The RMS2DC converter is used for sensors that output an AC waveform. This AC signal is converted to a DC voltage level that is passed through an analog mux to the micro-controller where the level is sensed and processed. The analog muxes are also used to pass analog DC levels to the micro-controller for processing. The RS232/RS485 transceiver converts CMOS signals to either RS232 or RS485 format so the SIR can communicate with sensors using these communication standards. The PSoC3 device has specific pins that can be used for I2C communication. Pull-up resistors have been added to these pins and the port configuration is used to configure these pins for I2C when needed. The PSoC3 can also directly perform UART communication with sensors using this standard. For those standards for which the PSoC3 can directly communicate with the sensor, the data is receive by the PSoC3 is passed to the micro-controller through the UART interface between these blocks. Currently, there is no plan to process the data within the PSoC3 before passing it to the micro-controller. However, the pre-processing capability does exist with the PSoC3 device and may be used is deemed necessary.

Figure 9:
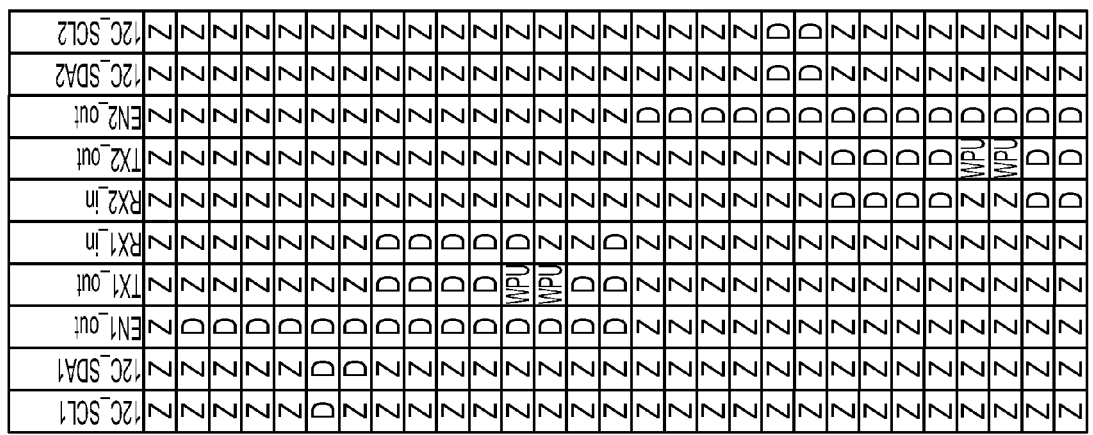
FIG. 9 illustrates a truth table of the configuration information communicated from the preferred SIP 20 embodiment of FIG. 7.
Figure 10:
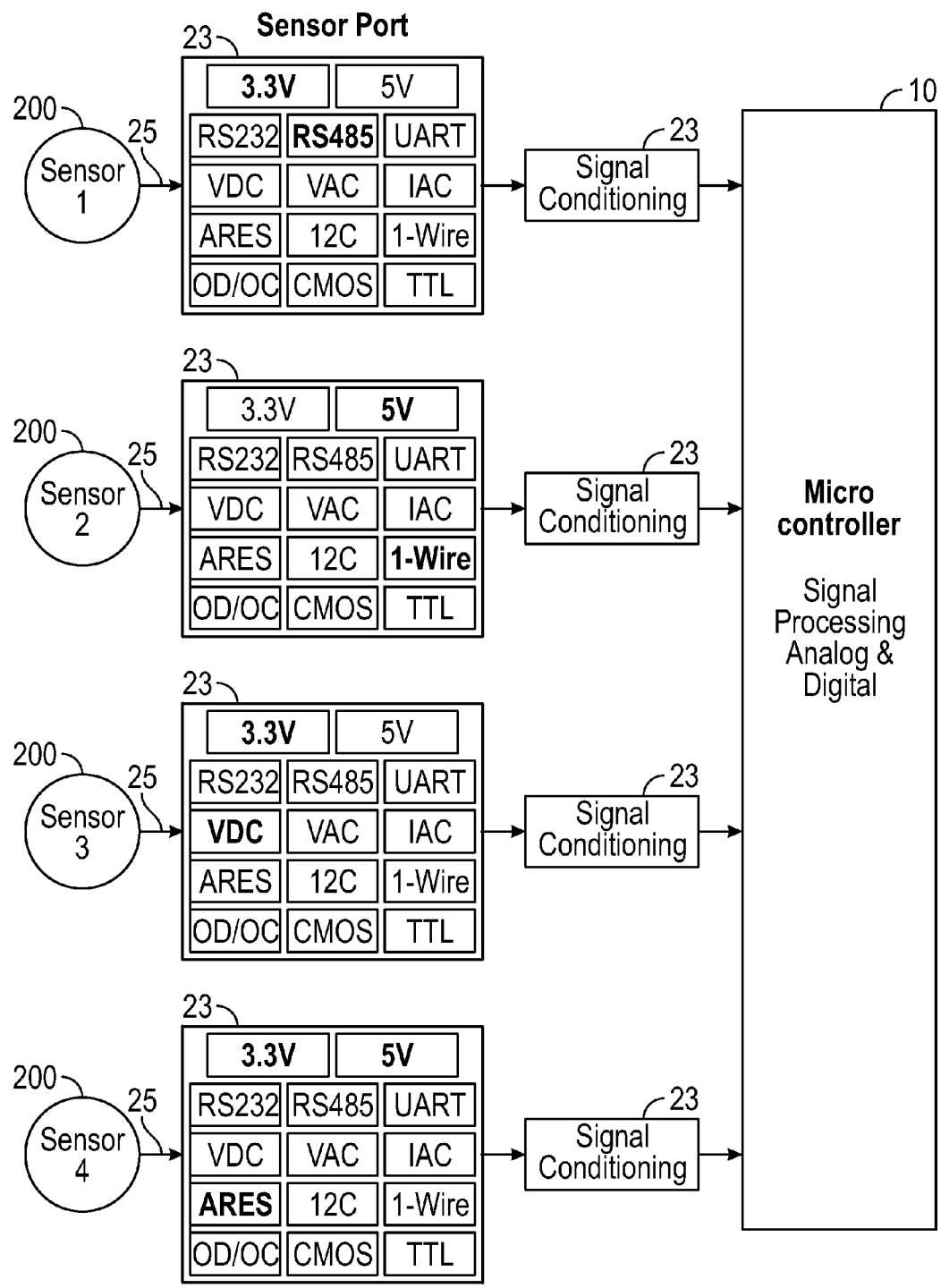
FIG. 10 illustrates a block diagram showing several sensors receiving and transmitting data to the microcontroller.

The SIP 20 architecture has been designed so that only the circuitry required to perform a reading is powered up. This scheme saves on battery life but requires special timing between signal activation. The following items must be ensured in order for this scheme to work properly: (1) the blocks must be powered up prior to taking a reading; (2) the control signals must be set appropriately before and after a block is powered up; and (3) the blocks must be powered down after taking a reading. The port control signal truth table is shown in in the truth table of FIG. 9. The table contains the following information: Port mode; Port number and power supply level; Port power switch control signals; Communication standard control signals; and Data signals. The truth table illustrates the how the SIP 20 sequentially enables the power switches and power multiplexer 24 and programming of the sensor interface circuitry 23 (i.e. steps 218-224 of FIG. 6), after the SIP 20 associated with sensor coupling ports 1 and 2 is uniquely addressed and enabled (i.e. steps 210-222 of FIG. 6).

The port mode refers to the communication standard configured for the desired sensor coupling port 25. The port mode also includes the power down state. The port number specifies which sensor coupling port 25 is active. The power supply column specifies the sensor power supply voltage. The power switch enable control signals selects the power supply level applied to the sensor and the corresponding port components. The communication controls select the desired communication standard. The data signals specify the state of the pins for each standard.

The following describe the entries in the table: 1 & 0: High and low voltage levels; 10 or 01: Signal can be in either state but bit states correspond to each other (e.g. if DXEN1=1 then RXEN1_n=0); Z: Tristate output drivers or disable input buffers; D: Data can transition; and WPU: Driver is configured as a weak pull-up and strong pull-down.

The sensor coupling port 25 always starts and finishes in the power down state. The table columns have been grouped to denote a timing sequence relationship. The sensor coupling port 25 starts in the power down state. If the sensor coupling port 25 is selected the power switch controls will be activated when the PortEN signal is activated. This causes the power supply voltages to be selected and the corresponding components are powered up. Note that the other signals will not change from the power down state until the components have finished powering up. The power up time will be set by the component requiring the longest time to power up and initialize. This information is gathered from the component datasheets to become a variable in the firmware in the SIP 20. Once power up is complete the communication controls will be switched by the SIP 20 via UART signals sent from the first processing unit to state machines within the SIP firmware depending on the communication standard configured. After the communication controls have switched a sensor reading is performed. Once the sensor reading has been taken the communication controls are switched back to the power down state. After the communication controls have reached their power down states the power switch controls are set back to their power down state. At this point the SIP 20 is back in the power down mode and ready to perform another sensor reading.

The sequence described above applies when the SIR device is operating on battery power. If the SIR device is powered from an external source the power switch controls and the communication controls can remain active for all the sensor coupling ports 25. For this situation the port address selects ("PortAddr$_{0...n}$") which sensor coupling ports 25 will be read and the port enable signal ("PortEn") initiates the reading when activated and terminates the reading when deactivated.

Currently the SIP 20 supports the communication standards listed previously. However, the architecture has been designed to utilize an expansion board to accommodate more standards in the future. An expansion board is a separate board that can be plugged onto the existing board and replaces an existing sensor port. The port expansion board will contain the necessary components to perform the desired communication standard and the original sensor port will be used to communicate the port expansion board reading to the micro-controller. In other words, the port expansion board will appear as a sensor being connected to the main board. The UART communication standard will be used to communicate between the main board and the expansion board.

The expansion board scheme will be implemented by providing headers on the main board that ship the necessary signals to the expansion board when it is plugged into the main board. The original sensor port PSoC3 device has additional control signals dedicated for the expansion board. The port expansion board control signals will only be functional if the port expansion board exists. This scheme will allow future communication standards to be employed without requiring a major redesign to the main board.

Once the sensor data is received by the sensor port 25 via the sensor interface circuitry 23, the sensor interface 22 architecture routes the signals through appropriate signal conditioning circuits before sending them to either digital or analog processing blocks. In the digital processing unit the sensor data is extracted and in the analog processing unit the sensor data is digitized. A central processing unit then receives the digitized sensor data from both the analog and digital processing units and performs further analysis before communicating it to the remote location.

In addition to supporting a dozen or more sensor interface standards, the architecture is flexible by providing options to expand support for additional sensor interfaces. It does so by allowing addition of translation blocks to convert new sensor interfaces to one of the supported interfaces. With this capability, support for new sensor interfaces is almost limitless. This expansion happens at the periphery of the sensor interface without impacting the core architecture. This is critical in allowing the base architecture to remain unchanged for a wide variety of Internet of Things (IoT) applications, enabling a quick time to market.

In some applications wireless sensors are a more practical method of monitoring an asset in spite of the high cost and power. In such cases the sensor data is transmitted over a radio communication channel to a receiver. Typically the receiver demodulates the message into digital form and sends it over a serial interface to a processor. The SIR architecture supports some of the common serial interfaces like RS232, RS485, UART etc. This enables the SIR to physically interface with an external radio module to receive the wireless sensor data.

Functional Description of the Cellular Radio—

The cellular radio is intended to perform long haul communications. The Janus cellular module HSPA910CF that includes the Telit HE910 cellular chip has been chosen for the SIR device although the provider of the cellular radio should not be limited to a single version or provider. Other embodiments using alternate radios may be accomplished using the same implementation. The communication between the PSoC and the cellular module will be performed through a UART connection. This communication standard has been chosen since the PSoC5 device does not include a USB host which is required for USB communication with the cellular module.

The PSoC5 has a limited number of pins allotted to interface with the communication modules. The SIR architecture includes a multiplexor that multiplexes the Cellular, GPS, POTS, and ZigBee modules signals to specific PSoC5 pins. If the cellular module is not required the multiplexor will be used to connect a separate GPS module and ZigBee module to the same PSoC5 pins. Similarly, if the SIR requires POTS communication the cellular module will be replaced with a POTS module and the POTS signals will be muxed to the PSoC5 device.

The cellular radio consumes a large current when transmitting and is not designed for low current consumption when disabled. Therefore, the cellular radio may be powered down when it is not required for communication. The PSoC IO's interfacing with the cellular radio must be either driven low or tri-stated when the cellular radio is powered down to prevent the ESD protection devices on the pin from forward biasing resulting in large unwanted current to flow.

Signals—

Only required pins are denoted as being connected to the PSoC device. These pins include the UART signaling pins and enable type pins.

ZigBee Radio—

The ZigBee radio will be used to perform short haul communications. The architecture currently allocates pins for the ZigBee radio. The pins allocated are based on using UART communication between the module and the PSoC.

Functional Description of the GPS Radio—

The SIR architecture currently provides a slot for a separate GPS radio. The cellular module also includes a GPS radio. The GPS located on the cellular radio is expected to be used and a separate GPS radio module will be placed on the board when the cellular radio is not placed on the board.

The cellular and separate GPS radios are multiplexed onto the same PSoC pins since they are not planned to be used at the same time.

The FRAM is a ferroelectric nonvolatile RAM. It performs read and write operations like a standard RAM and does not have the overhead associated with standard serial FLASH memories. The intent of this memory is to store sensor data and unsent messages in an advent that the SIR power is lost or issues exist such that the SIR cannot communicate with the remote hardware and software system. The SPI bus will be used to read and write data between the micro-controller and the FRAM.

A Lithium-Ion battery is currently planned to be used to power the SIR device. The following sections describe the assumptions and provide a battery life estimate based on these assumptions.

Assumptions—

The operating conditions for meeting the 2 year battery life requirement are left up to design. The current operating assumptions used to estimate the battery life are as follows: A maximum of 2 cellular communications are performed per day (the total cellular transmission time is 3 seconds per transmission and includes any GPS communications that may occur); the SIR device will perform sensor readings every 30 minutes; all devices expect the micro-controller, micro-controller regulators, and the accelerometer are power-down (power supplies are disconnected) when the SIR device is not performing operations; and the battery life calculations assume 85% of the rated battery mAh to account for inefficiencies in the power system design and an additional 15% derating due to battery self-discharge.

Calculations—the battery life estimates are enhanced by separate operating modes. The time spent in each mode is based on the assumptions in the previous section and the current consumed in each mode is estimated.

Sleep Mode—during sleep mode all components will be powered down except the micro-controller and the accelerometer. Since the SIR device will predominately be in sleep mode the time estimate for this mode is set to 2 years. The sleep mode effect on battery life is summarized in Table 15.

Standby Mode—during standby Mode all the powered down devices are powered up. Only the components that will initially perform operations are enabled during this mode. The components that are enabled during this mode are the micro-controller and the serial interface port. All other components are powered up but remain in a low current consumption mode.

Active Mode—during active mode all the blocks are enabled and the sensor readings are performed and processed. The active mode effect on battery life is summarized in Table 17.

Comms Mode—During communication mode the micro-controller communicates to the cellular radio and the cellular radio communicates to remote hardware and software. Most of the other blocks in the SIR device are powered down to conserve battery life.

While various embodiments have been described, those skilled in the art will recognize modifications of variations that might be made without departing from the present disclosure. The examples illustrate the various embodiments and are not intended to limit the present disclosure. Therefore, the description and claims should be interpreted liberally with only such limitation as is necessary in view of the pertinent prior art.

We claim:

1. A method of obtaining inputs from a plurality of sensor coupling ports, comprising the steps of: from a first processing unit, communicating a state change on a first common addressing signal coupled to each of a plurality of second processing units and uniquely addressing one of the plurality of second processing units on at least one additional addressing signal;
communicating from the first processing unit to each of the plurality of second processing units a subsequent state change on a common enable signal line coupled to each of the plurality of second processing units;
detecting the state change on the first common addressing signal, the unique addressing, and the subsequent state change on the common enable signal line in one of the plurality of second processing units; and
communicating from the first processing unit to the one uniquely addressed second processing unit to receive an input to the first processing unit from the sensor coupling port.

2. The method of claim 1 wherein,
uniquely addressing one of the plurality of second processing units further comprises the step of addressing over a plurality of addressing signals respectively coupled to each of the second processing units.

3. The method of claim 1 further comprising the step of,
communicating configuration information from the uniquely addressed second processing unit to a sensor interface circuit that communicates over the sensor coupling port in a standard selected from RS232, RS485, UART, Open Collector, Open Drain, I2C, Maxim 1-Wire, Analog AC voltage, Analog DC voltage, Analog Resistance, CMOS, or TTL.

4. The method of claim 1 further comprising the step of,
eliminating power from any non-uniquely addressed remaining plurality of second processing units.

5. The method of claim 1 further comprising the steps of,
uniquely addressing a second of the plurality of second processing units,
subsequently initiating a state change on the common enable signal line coupled to each of the plurality of second processing units,
and detecting both the unique addressing and the subsequently initiated state change on the common enable signal line in the second of the plurality of second processing units, and communicating from the first processing unit to the second uniquely addressed second processing unit to receive input from the second sensor coupling port.

6. The method of claim 5 further comprising the step of,
communicating configuration information from the second uniquely addressed second processing unit to a second sensor interface circuit that communicates over the second sensor coupling port in a standard selected from RS232, RS485, UART, Open Collector, Open Drain, I2C, Maxim 1-Wire, Analog AC voltage, Analog DC voltage, Analog Resistance, CMOS, or TTL.

7. The method of claim 1 further comprising the step of,
sourcing a sensor power supply signal to one of the plurality of sensor coupling ports prior to communicating the state change on the first common addressing signal.

8. The method in claim 1 further wherein,
the plurality of sensor coupling ports are unpowered and communicating a state change on a first common addressing signal after receipt of an interrupt from at least one of the sensor coupling ports.

9. The method in claim 1 wherein,
the plurality of sensor coupling ports are unpowered and communicating a state change on a first common addressing signal is initiated at programmed intervals.

10. The method in claim 1 wherein,
the sensor coupling port communicates with a standard selected from RS232, RS485, UART, Open Collector, Open Drain, I2C, Maxim 1-Wire, Analog AC voltage, Analog DC voltage, Analog Resistance, CMOS, or TTL.

11. The method in claim 10 further comprising the step of,
enabling a circuit to communicate with a standard selected from RS232 and RS485.

12. The method in claim 10 further comprising the step of,
enabling a circuit to convert root mean square readings to DC voltage readings and communicating the DC voltage readings to the first processing unit.

13. The method in claim 1 further comprising the steps of,
eliminating power to the plurality of second processing units and transmitting the input to at least one remote hardware and software system; and
placing the first processing unit into a standby mode.

14. The method of claim 1 further comprising the steps of,
eliminating power to the plurality of second processing units and transmitting the input under a selected set of conditions to at least one remote hardware and software system; and
placing the first processing unit into a standby mode.

15. The method in claim 1 wherein,
the communication is selected from Cellular, ZigBee, and POTS.

* * * * *